United States Patent
Goetgeluk

(10) Patent No.: US 11,301,032 B2
(45) Date of Patent: *Apr. 12, 2022

(54) LOCOMOTION SYSTEM AND APPARATUS

(71) Applicant: Virtuix Holdings Inc., Austin, TX (US)

(72) Inventor: Jan Goetgeluk, Houston, TX (US)

(73) Assignee: VIRTUIX HOLDINGS INC., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/813,428

(22) Filed: Mar. 9, 2020

(65) Prior Publication Data
US 2020/0218339 A1    Jul. 9, 2020

Related U.S. Application Data

(63) Continuation of application No. 15/716,238, filed on Sep. 26, 2017, now Pat. No. 10,635,162, which is a (Continued)

(51) Int. Cl.
*A63G 31/16* (2006.01)
*A63B 69/00* (2006.01)
(Continued)

(52) U.S. Cl.
CPC .......... *G06F 3/011* (2013.01); *A63B 69/0035* (2013.01); *A63B 69/0064* (2013.01); *A63B 71/0622* (2013.01); *A63G 31/16* (2013.01); *A63B 2024/0096* (2013.01); *A63B 2069/0037* (2013.01); *A63B 2071/0638* (2013.01); *A63B 2210/50* (2013.01); *A63B 2220/10* (2013.01);
(Continued)

(58) Field of Classification Search
CPC .......... G06F 3/011; G06F 3/01; A63G 31/00; A63G 31/16
USPC ..... 472/59–61, 130; 434/34, 55; 463/30–31, 463/34, 36–39; 482/4, 34, 147
See application file for complete search history.

(56) References Cited

U.S. PATENT DOCUMENTS

| | | | |
|---|---|---|---|
| 5,913,727 A * | 6/1999 | Ahdoot | A63F 13/06 463/39 |
| 6,270,414 B2 | 8/2001 | Roelofs | |

(Continued)

FOREIGN PATENT DOCUMENTS

| WO | 2006017926 A1 | 2/2006 |
|---|---|---|
| WO | 2010089618 A2 | 8/2020 |

OTHER PUBLICATIONS

Office Action; Korean Application No. 10-2017-7003680; dated Mar. 8, 2019.
(Continued)

*Primary Examiner* — Kien T Nguyen
(74) *Attorney, Agent, or Firm* — Polsinelli PC

(57) ABSTRACT

A locomotion system for use with a virtual environment technology includes a platform configured to support a user, a harness support assembly coupled to the platform and extending upwardly from the platform, and a safety harness configured to be worn by the user. The harness support assembly includes a support halo positioned above the platform and extending about a vertical central axis. The safety harness includes an interface structure moveably coupled to the support halo.

20 Claims, 28 Drawing Sheets

Related U.S. Application Data continuation of application No. 15/088,568, filed on Apr. 1, 2016, now Pat. No. 9,785,230, which is a continuation of application No. 14/062,625, filed on Oct. 24, 2013, now Pat. No. 9,329,681.

(60) Provisional application No. 61/757,986, filed on Jan. 29, 2013, provisional application No. 61/717,761, filed on Oct. 24, 2012.

(51) Int. Cl.
*G06F 3/01* (2006.01)
*A63B 71/06* (2006.01)
*A63B 24/00* (2006.01)

(52) U.S. Cl.
CPC ....... *A63B 2220/12* (2013.01); *A63B 2220/40* (2013.01); *A63B 2220/805* (2013.01); *A63B 2225/093* (2013.01); *A63B 2225/50* (2013.01); *G06F 2203/012* (2013.01)

(56) References Cited

U.S. PATENT DOCUMENTS

| | | | |
|---|---|---|---|
| 7,470,218 B2* | 12/2008 | Williams | ........... A63B 23/0464 |
| | | | 482/148 |
| 2001/0003712 A1 | 6/2001 | Roelofs | |
| 2007/0109259 A1 | 5/2007 | Liu | |
| 2009/0111670 A1* | 4/2009 | Williams | ................ G06F 3/011 |
| | | | 482/146 |

OTHER PUBLICATIONS

International Patent Application No. PCT/US2013/066662. PCT International Search Report and Written Opinion dated Feb. 19, 2014.

* cited by examiner

LOCOMOTION SYSTEM AND APPARATUS

CROSS-REFERENCE TO RELATED APPLICATIONS

This application is a continuation of U.S. patent application Ser. No. 15/716,238, filed Sep. 26, 2017, which is a continuation of U.S. patent application Ser. No. 15/088,568, filed Apr. 1, 2016, which is a continuation of U.S. patent application Ser. No. 14/062,625, filed Oct. 24, 2013, which claims benefit of U.S. Provisional patent application Ser. No. 61/717,761 filed Oct. 24, 2012, and entitled "Locomotion System and Apparatus," and also claims the benefit of U.S. provisional patent application Ser. No. 61/757,986 filed Jan. 29, 2013, and entitled "Locomotion System and Apparatus," which is hereby incorporated herein by reference in its entirety.

STATEMENT REGARDING FEDERALLY SPONSORED RESEARCH OR DEVELOPMENT

Not applicable.

BACKGROUND

The present disclosure generally relates to locomotion devices that can be used in conjunction with virtual reality systems.

Within a virtual reality environment, users typically desire the ability to walk freely. In particular, the ability to physically walk or run in the real environment and have that motion translated to the virtual environment significantly increases the level of immersion of the user in the virtual environment. However, movement in the real world is often limited by physical space limitations (e.g., the size of the room within which the user is located). Accordingly, locomotion devices are designed to provide the user the sensation of walking freely, while confining the user to a specific location. For example, many locomotion devices allow a user to walk freely, in 360 degrees, on a platform having a finite size without ever leaving the platform.

Conventional locomotion devices include motorized and non-motorized designs, which may be used in conjunction with virtual reality environments in a multitude of applications including but not limited to gaming. Examples of applications beyond gaming include employee training; combat training; physical therapy; exercise; virtual work environments; virtual meeting rooms (for both professional and personal purposes); sports simulation and training; and virtual tourism, concerts, and events.

Motorized locomotion devices typically use sensors to detect the movement of the user and send feedback to motors driving belts or rollers on which the user moves. The belts or rollers are operated to counter the user's movements and bring the user back to a central portion of the platform after each step. There are many drawbacks to motorized locomotion devices. For example, the motorized locomotion devices are usually complex and expensive because of the rolling and motorized components, sensors, processing units, and feedback loops. In addition, complex algorithms are required for the rolling and motorized components to properly counter the movements of the user. Inaccurate feedback to the motor can result in erroneous movement of the belts or rollers that may cause the user to lose balance or drift away from the center of the platform. There may also be issues with latency of feedback and response when the user accelerates, causing incorrect movements or responses that are too slow, potentially allowing the user walk off the platform. Further, because the response movements of the belts or rollers counteract the user's movements, the user may be prone to lose balance and trip.

In addition to issues with the operation of motorized locomotion devices, such devices are usually large and bulky, and thus, do not fit in the average-sized residential room (e.g., a game room, living room, or bedroom) and can be difficult to break up into modular pieces for shipping and storage. The devices are necessarily large, to prevent the user from walking off the platform before the correct system response has been processed; thus, rendering the devices unsuitable for in-home consumer usage.

Non-motorized locomotion devices lack motorized components and rely on the user's movement and/or gravity to bring the user back to the center of the platform after each step. Omni-directional ball bearing platforms, for example, have hundreds of ball bearings that allow the user to walk in place while a restraint around the user's waist keeps the user in place. A major issue with omni-directional ball bearing platforms is that the user does not experience a natural gait with a heel-toe strike movement, but rather instability similar to that of walking on ice. The instability results in the shuffling of feet where neither heel nor toe lift off the device, resulting in an unnatural walking gait that reduces the immersion of the user in the virtual environment. Moreover, these devices are typically heavy and expensive due to the plurality of rolling components.

Another non-motorized locomotion device is a saucer-like device with a smooth, upward facing concave surface. The user typically wears special shoes and then "walks" on the slick concave surface, repeatedly sliding his/her feet back and forth while his/her body remains primarily in the center of the device. Although saucer-like devices are relatively simple, small, and can fit in a residential room, there are several disadvantages. First, the user does not experience a natural gait with a heel-toe strike movement, but rather instability similar to that of walking on ice due to the low-friction properties of the concave surface and special shoes, which lack any foot-stabilizing elements. Thus, the user is forced to shuffle his/her feet to help maintain stability as opposed to employing a natural stepping motion. Further, there is no safety mechanism or device to prevent the user from falling during use.

Another non-motorized locomotion device is a large hollow spherical ball approximately 10 feet in diameter. The user enters the ball through a replaceable panel and walks within the ball as the ball rotates about its center relative to the surrounding environment. The ball device also has several issues. First, it is difficult and unnatural to start and stop movement of the ball, which may result in user instability. Further, because the size of the ball is necessarily constrained, the walking area is not planar, which also results in a less natural walking experience. In addition to the ball device being too large to fit in a residential room, such commercially available balls are also cost-prohibitive for household consumers.

Accordingly, there remains a need for locomotion devices that allow users to safely access virtual environments in the privacy of the user's home and while providing the sensation of a more natural walking gait.

BRIEF SUMMARY OF THE DISCLOSURE

The embodiments described herein are generally directed to a locomotion system for use with a virtual environment technology comprising a platform configured to support a user, a harness support assembly coupled to the platform and extending upwardly from the platform, wherein the harness support assembly includes a support halo positioned above the platform and extending about a vertical central axis, and a safety harness configured to be worn by the user. The safety harness includes an interface structure moveably coupled to the support halo.

In an embodiment, a locomotion system for use with a virtual environment technology comprises a platform configured to support a user, a harness support assembly coupled to the platform and extending upwardly from the platform, wherein the harness support assembly includes a support halo positioned above the platform and extending about a vertical central axis, and a safety harness including a belt configured to be worn by the user, an interface structure coupled to the belt, and a vertical member coupled to the belt. The interface structure slidingly engages an upper surface of the support halo, and the vertical member is disposed within the support halo and is configured to limit the radial movement of the interface structure relative to the support halo.

In an embodiment, a virtual reality system comprises a locomotion system including a platform configured to support a user, a harness support assembly coupled to the platform, and a safety harness configured to be worn by the user. The harness support assembly includes a support halo positioned above the platform and extending about a vertical central axis, and wherein the safety harness is configured to move relative to the support halo. The virtual reality system further comprises a processing unit, a motion sensing device in communication with the processing unit and configured to detect and track the motion of the user, a visual display in communication with the processing unit, and a controller configured to be held by the user.

Embodiments described herein comprise a combination of features and advantages intended to address various shortcomings associated with certain prior devices, systems, and methods. The foregoing has outlined rather broadly the features and technical advantages of the invention in order that the detailed description of the invention that follows may be better understood. The various characteristics described above, as well as other features, will be readily apparent to those skilled in the art upon reading the following detailed description, and by referring to the accompanying drawings. It should be appreciated by those skilled in the art that the conception and the specific embodiments disclosed may be readily utilized as a basis for modifying or designing other structures for carrying out the same purposes of the invention. It should also be realized by those skilled in the art that such equivalent constructions do not depart from the spirit and scope of the invention as set forth in the appended claims.

BRIEF DESCRIPTION OF THE DRAWINGS

For a detailed description of the preferred embodiments of the invention, reference will now be made to the accompanying drawings in which:

FIG. 5a is a cross-sectional end view of the channels and ridges extending along the top surface of the section of FIG. 3a;

FIG. 6b is a top view of the safety device of FIG. 6a;

FIG. 17b is an enlarged perspective partial view of the locomotion platform of FIG. 38a;

DETAILED DESCRIPTION OF THE PREFERRED EMBODIMENTS

Figure 1:
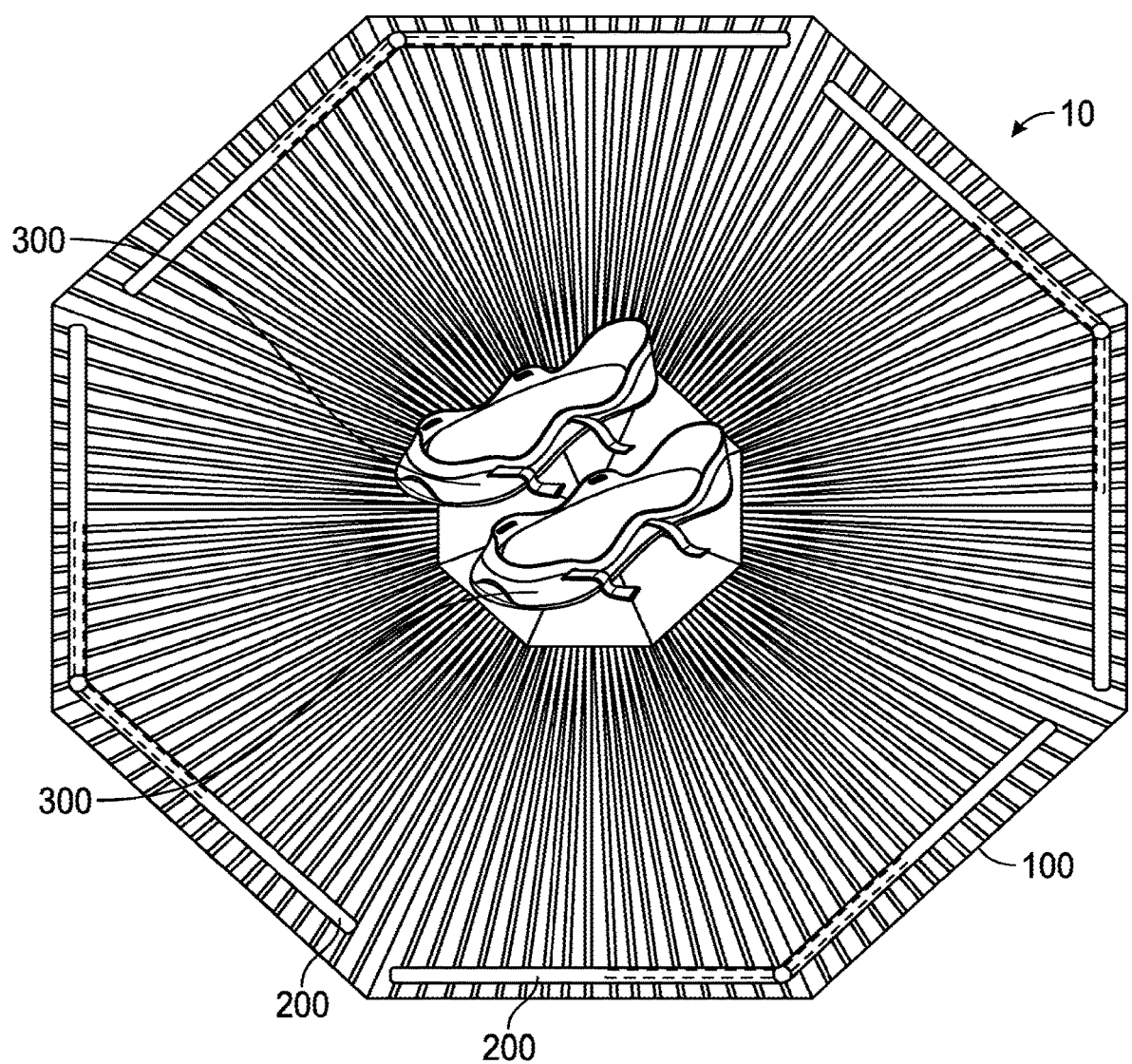
FIG. 1 is a top view of an embodiment of a locomotion system in accordance with the principles described herein.

The following discussion is directed to various exemplary embodiments. However, one skilled in the art will understand that the examples disclosed herein have broad application, and that the discussion of any embodiment is meant only to be exemplary of that embodiment, and not intended to suggest that the scope of the disclosure, including the claims, is limited to that embodiment.

Certain terms are used throughout the following description and claims to refer to particular features or components. As one skilled in the art will appreciate, different persons may refer to the same feature or component by different names. This document does not intend to distinguish between components or features that differ in name but not function. The drawing figures are not necessarily to scale. Certain features and components herein may be shown exaggerated in scale or in somewhat schematic form and some details of conventional elements may not be shown in interest of clarity and conciseness.

In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection, or through an indirect connection via other devices, components, and connections. As another example, two components that contact each other or slidingly engage each other would be coupled. In addition, as used herein, the terms "axial" and "axially" generally mean along or parallel to a central axis (e.g., central axis of a body or a port), while the terms "radial" and "radially" generally mean perpendicular to the central axis. For instance, an axial distance refers to a distance measured along or parallel to the central axis, and a radial distance means a distance measured perpendicular to the central axis.

The locomotion device and system disclosed herein employs a platform, a safety assembly, and variable-friction foot coverings that are intended to address certain shortcomings associated with previous locomotion devices. The locomotion device allows the user to use his/her natural gait while exercising freedom of movement in the physical world that translates to movement in a virtual environment.

Referring now to FIG. 1, an embodiment of a locomotion system 10 in accordance with the principles described herein is shown. In this embodiment, locomotion system 10 includes a base or platform 100, a safety assembly 200 coupled to platform 100, and variable-friction shoes or foot coverings 300. As will be described in more detail below, the user of system 10 stands and moves on platform 100 using shoes 300, while safety assembly 200 provides a means to protect the user during use of system 100.

Figure 2:
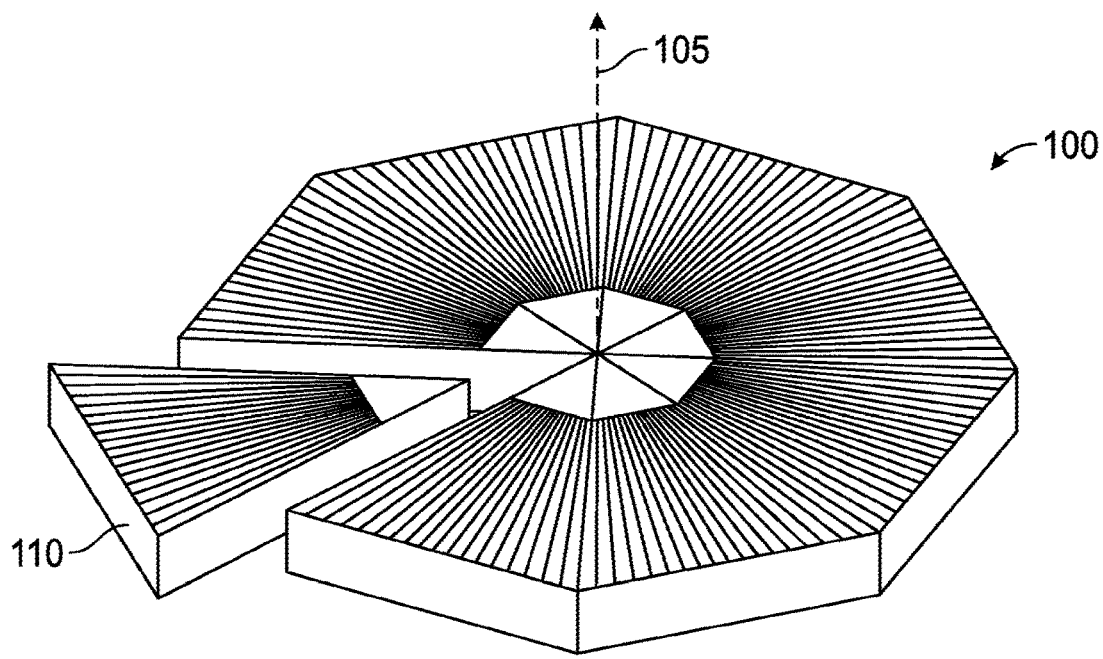
FIG. 2 is a perspective exploded view of the locomotion platform of FIG. 1.
Figure 3A:
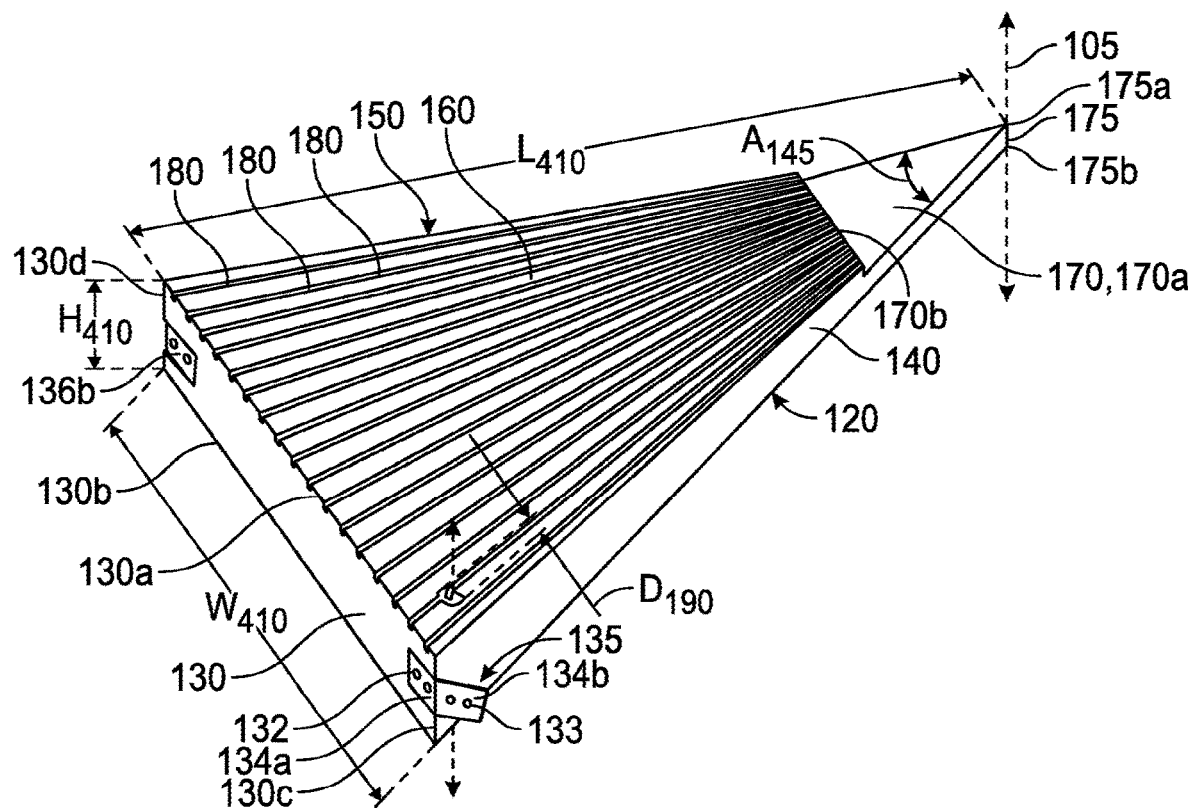
FIG. 3a is a perspective view of a section of the locomotion platform of FIG. 1.

Referring now to FIGS. 2 and 3a, in this embodiment, platform 100 has a vertical central axis 105 and includes eight circumferentially adjacent generally triangular sections 110. Each platform section 110 has a planar bottom or lower surface 120, a planar back face 130, a planar left side face 140, and a planar right side face 150, and a top or upper surface 160. Faces 130, 140, 150 extend perpendicularly upward from lower surface 120, however, as will be described in more detail below, an inner portion of upper surface 160 is oriented parallel to lower surface 120 and an outer portion of upper surface 160 is oriented at an acute angle relative to lower surface 120. Platform sections 110 are arranged circumferentially adjacent one another such that the entirety of each left face 140 abuts the entirety of a right face 150 of an adjacent section 110. Since each platform section 110 is identical in this embodiment, platform 100 is a regular polygon—having all sides the same length that are symmetrically placed about a common central point. In particular, since eight sections 110 are provided in this embodiment, when all platform sections 110 are properly aligned, platform 100 forms an octagon shape. However, in other embodiments, different numbers of platform sections (e.g., sections 110) may be provided, resulting in different geometries for platform 100. For example, a platform having six circumferentially adjacent sections will have a hexagonal shape. Platform 100 preferably has a diameter or maximum horizontal width between 3.0 and 6.0 feet, and more preferably between 3.5 and 4.5 feet.

Figure 3B:
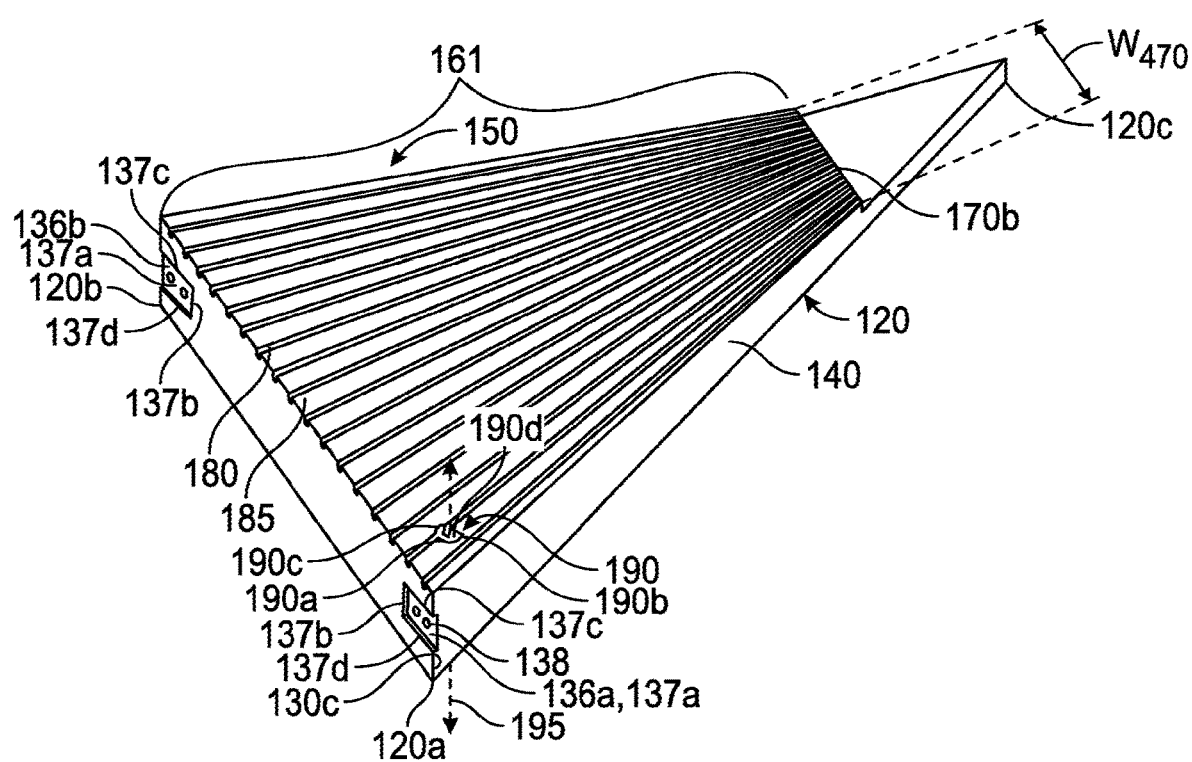
FIG. 3b is a perspective view of a section of the locomotion platform of FIG. 1.

Referring now to FIGS. 3a and 3b, each platform section 110 includes a center zone 170, a plurality of channels or grooves 180, a through hole 190, and a coupling mechanism 135. Sections 110 each have a length $L_{110}$ (measured horizontally from an inner edge 175 at axis 105 to back face 130) preferably between 18.0 and 34.0 inches, a width $W_{110}$ (as measured horizontally along back face 130 between the left and right side faces 140, 150) preferably between 16.0 and 30.0 inches, and a height $H_{110}$ (as measured vertically between the top and bottom faces 160, 120, respectively, along the back face 130) preferably between 2.0 and 12.0 inches. Each section 110 is constructed from a single material that has a low coefficient of friction, such as high density polyethylene, low density polyethylene, polyvinyl chloride, polypropylene, or any other suitable material with a low coefficient of friction.

Bottom face 120 lies in a plane, and is triangular with outer end points 120a, 120b that are equidistant from inner end point 120c. When describing the individual sections 110 of platform 100, the terms "inner" and "outer" are used in reference to the assembled platform 100 as shown in FIG. 1 where the outer edges of the platform 100 coincide with the back face 130 of each section 110 and the center of platform 100 coincides with the inner edge 175 of each section 110, which is coaxial with central axis 105. Inner edge 175 comprises an upper end 175a and a lower end 175b. Inner end point 120c of the bottom face 120 is coincident with central axis 105 and lower end 175b of inner edge 175.

Back face 130 lies in a plane oriented perpendicular to bottom face 120, extends from bottom face 120 axially upward to upper surface 160, and has upper edge 130a, lower edge 130b, left edge 130c, and right edge 130d. The left and right side faces 140, 150, also oriented perpendicular to bottom face 120, extend from left and right edges 130c, 130d of back face 130 and terminate at inner edge 175. In the present embodiment, the angle A145 between the left and right side faces 140, 150 is 45 degrees. It should be appreciated that angle A145 is dependent upon the number of sections 110 used to form platform 100. For example, as previously discussed, in an embodiment, platform 100 may be made up of six sections 110, then angle A145 would be 60 degrees. In another embodiment, platform 100 may be made up of nine sections 110 with an angle A145 of 40 degrees.

Figure 4A:
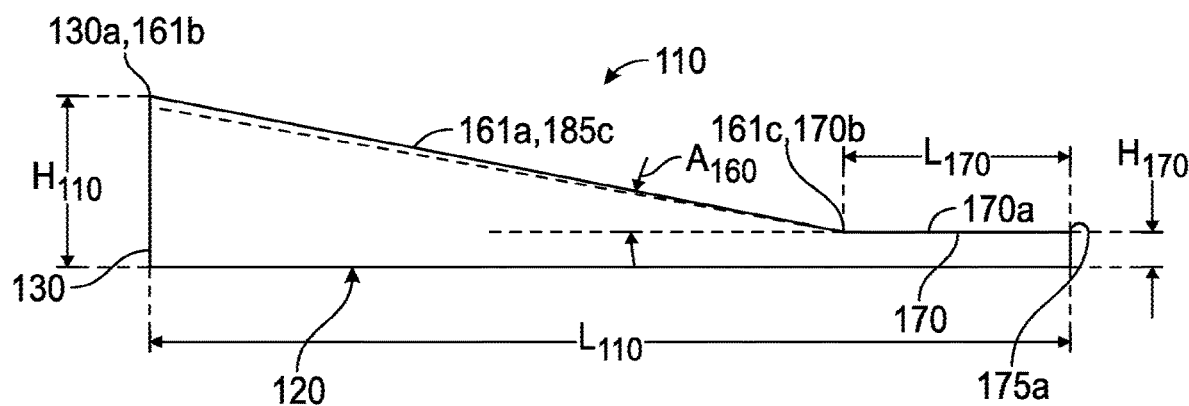
FIG. 4a is a side view of a section of the locomotion platform of FIG. 1.

Referring now to FIGS. 3a, 3b, and 4a, top surface 160 includes a center zone 170 and an angled portion 161. Center zone 170 comprises top face 170a; edge 170b, which is parallel to back face 130; and upper end point 175a of inner edge 175, which are coincident with axis 105. The triangular center zone top face 170a lies in a plane oriented parallel to bottom face 120. Center zone 170 has a length L170 (as measured horizontally between edge 170b and upper end point 175a) preferably between 5.0 and 10.0 inches, a width W170 (as measured along edge 170b between the left and right side faces 140, 150) preferably between 4.0 and 8.0 inches, and a height H170 (as measured vertically between the center zone top face 170a and bottom face 120 along inner edge 175) preferably between 0.25 and 2.0 inches. Though shown in the present embodiment parallel to bottom face 120, triangular center zone top face 170a may be curved such that upper end point 175a is disposed axially lower along axis 105 than edge 170b. In this alternative embodiment, edge 170b extends radially toward inner edge 175 and axially downward toward upper end point 175a while bulging downward toward bottom face 120.

Figure 4B:
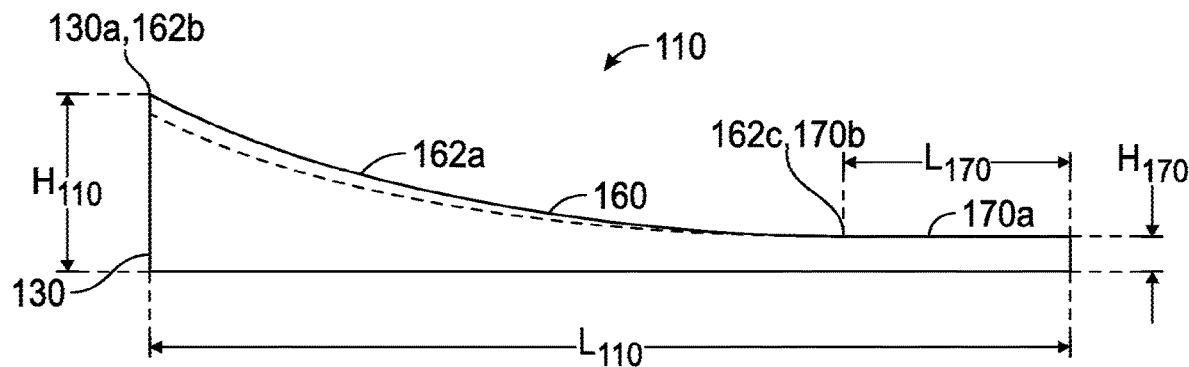
FIG. 4b is a side view of an alternative embodiment of a section of a locomotion platform in accordance with the principles described herein.

As best shown in FIGS. 3b and 4a, angled portion 161 of top surface 160 includes top face 161a; back edge 161b, which is coincident with back face edge 130a; and front edge 161c, which is coincident with center zone edge 170b and parallel to back face 130. Top face 161a lies in a plane and extends from outer edge 130a, 161b radially and axially downward toward edge 161c, 170b such that the angle A160 between the plane defined by top face 161a and the plane defined by center zone top face 170a is preferable between 5.0 and 18.0 degrees. In an alternative embodiment, shown in FIG. 4b, angled portion 161 of top surface 160 comprises top face 162a, back edge 162b, which is coincident with back face edge 130a; and front edge 162c, which is coincident with center zone edge 170b and parallel to back face 130. Top face 162a defines a curved surface that extends from outer edge 162b radially toward inner edge 170b and axially downward toward center zone top face 170a while bulging downward toward bottom face 120.

Figure 5A:
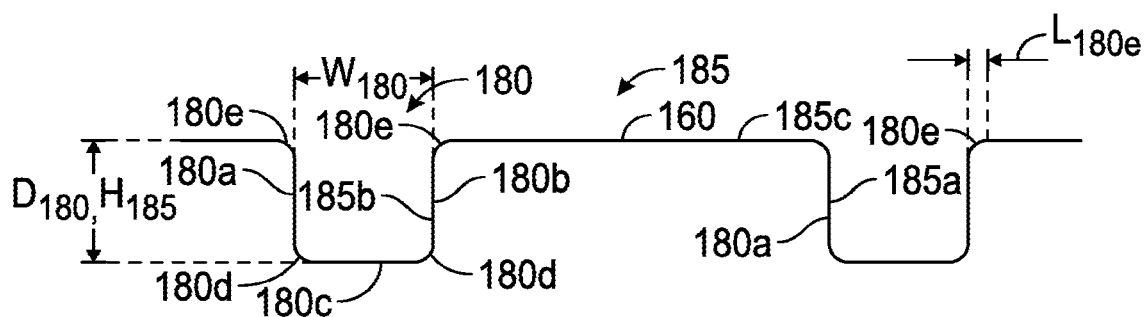

Referring again to FIGS. 3a and 3b, angled portion 161 also includes a plurality of channels or grooves 180 and ridges 185 that extend radially from back face 130 to edge 170b. As best shown in FIG. 5a, each channel 180 has a left interior edge 180a, a right interior edge 180b, and a bottom interior edge 180c. Left edge 180a is parallel to right edge 180b, and in this embodiment, both left and right edges 180a, 180b are orthogonal to bottom edge 180c. Each channel 180 has a width W180 preferably between 0.20 and 1.0 inch and a depth D180 preferably between 0.05 and 1 inch.

Referring still to FIG. 5a, each ridge 185 comprises a left exterior edge 185b, a right exterior edge 185a, and a top exterior edge 185c. Left exterior edge 185b is coincident with right interior edge 180b of channel 180 and is parallel to right exterior edge 185a, which is coincident with left interior edge 180a of channel 180. Both left and right exterior edges 185b, 185a are orthogonal to top exterior edge 185c. Each channel 180 has a height H185 preferably between 0.05 and 1 inch. However, the width, as will be discussed below in further detail, will vary depending on the quantity and size of the channels 180.

In the embodiment shown in FIG. 5a, the lower corners 180d where the left and right edges 180a, 180b connect to the bottom edge 180c are rounded, and the upper corners 180e of channel 180 where the left and right edges 180a, 180b connect to the top surface 160 of section 110 are rounded. The horizontal length L180e of the curved portion of the corner 180e (as measured from the right edge 180b to the flat portion of top surface 160) can be increased or decreased as desired.

Figure 5B:
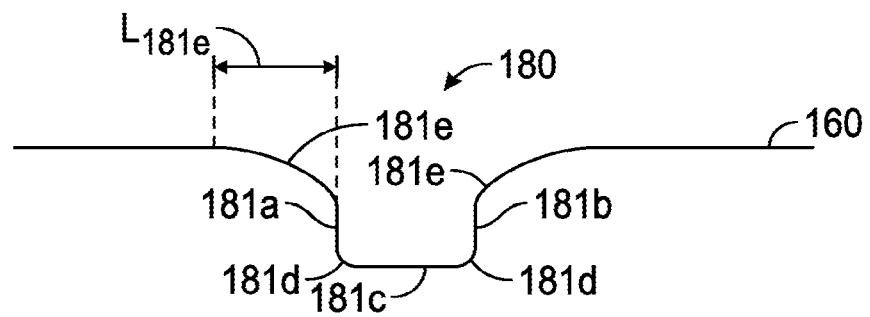
FIGS. 5b-5d are cross-sectional end views of alternative embodiments of channels and ridges that can be provided in the top surface of the sections of locomotion platforms in accordance with the principles described herein.
Figure 5C:
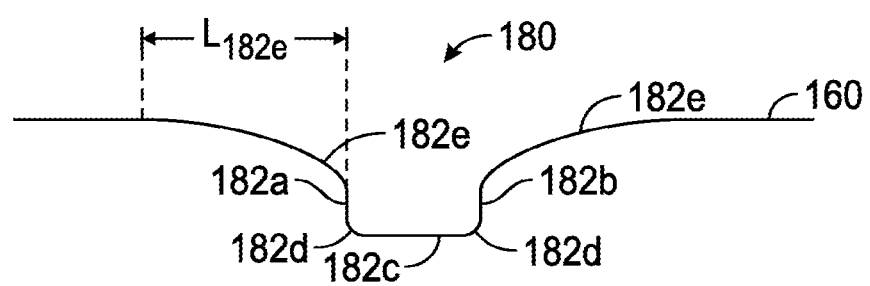

Referring now to FIGS. 5b and 5c, and using similar nomenclature for the left (181a, 182a), right (181b, 182b), bottom interior edges (181c, 182c), and lower (181d, 182d) and upper corners (181e, 182e), the horizontal length L181e5L182e of the curved portion of the upper corner 181e, 182e (as measured from the left edge 181a, 182a to the flat portion of top surface 160) can be increased or decreased as desired. For example, the curved length Lisle of the embodiment shown in FIG. 5b is less than the curved length L182e of the embodiment shown in FIG. 5c.

Figure 5D:
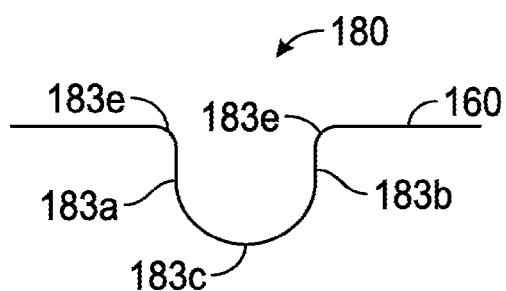

Referring now to FIG. 5d, in another embodiment, the bottom interior edge 183c forms a semicircle with a diameter equal to the horizontal distance between the left and right edges 183a, 183b. Corners 180d can, thus, vary from having ninety degree angles (between left and right edges 180a, 180b and bottom edge 180c), rounded ninety degree angles as shown in FIG. 5a, to having angles greater than ninety degrees but less than 180 degrees.

The foregoing discussion is directed to the geometry of the grooves 180 and ridges 185 at the back face 130 of platform section 110. However, the height H185 of the ridges 185 begins to taper (i.e., decrease) as the grooves 180 and ridges extend toward center zone 170. Ridge height H185 becomes gradually shorter until the top edge 185c of ridge 185 connects to center zone top face 170a at center zone inner edge 170b. The geometry and dimensions of the channels or grooves 180 remains unchanged as the ridges 185 diminish in height.

Each section 110 preferably comprises 16-18 channels 180; however, in general, the number of channels 180 can vary depending on the dimensions of each section 110 including the center zone 170 and the width W180 of each channel 180. Similarly, the quantity of ridges 185 will also vary depending on the quantity and dimensions of the channels 180 as well as the dimensions of each section 110. In the embodiment shown in FIG. 3a, section 110 has a length $L_{110}$ of 24.0 inches and 17 channels 180 that may be 0.20 to 0.375 inch wide and spaced approximately 0.79 to 0.97 inch apart; thus, the 16 ridges 185 may be 0.79 to 0.97 inch wide.

In another embodiment, the width W180 of the channels 180 may vary between outer edge 130a and center zone 170. For example, the width of a channel 180 may be greater at outer edge 130a than at center zone edge 170b. In yet another embodiment, the depth D180 of channels 180 may be less than 0.5 inch and the width W180 of the channels 180 may be less than 0.2 inch, allowing each section 110 to comprise more than 18 channels 180 such that the ridges 185 form soft raised ribs on the upper surface 160 of each section 110.

Referring now to FIG. 3b, vertical through hole 190, having central axis 195 parallel to central axis 105, includes a curved side wall 190a and a planar side wall 190d connected at end points 190b, 190c to form a through hole with a semicircle shaped cross section that extends from top surface 160 downward to bottom face 120. Through hole 190 is disposed proximal to left edge 130c of back face 130—approximately equidistant to back face 130 and left face 140—and with axis 195 oriented parallel to axis 105, back face 130, and left face 140. In the present embodiment, through hole 190 is oriented such that planar side wall 190d is orthogonal to left side wall 140 of platform section 110. Through hole 190 also has a diameter D190 (shown in FIG. 3a) preferably between 0.8 and 1.25 inches (as measured between end points 190b, 190c) that is preferably 0.5 to 2.0 inches away from back face 130 and left face 140.

Through hole 190 may be located anywhere along and proximal to back face 130, including for example but not limited to proximal to right face 150 or equidistant between left and right faces 140, 150. Though shown in the present embodiment as a semicircle, through hole 190 may be of any shape including but not limited to a circle, ellipse, square, rectangle, or polygon. Further, through hole 190 may be oriented or rotated in various ways, for example, the semicircle shape may be rotated in place to change the location of the curved side wall 190a. In addition, central axis 195 of through bore 190 may be oriented at an angle either toward or away from central axis 105 of platform 100 at an angle preferably between 0.1 and 45.0 degrees. Further, as shown in FIG. 1, through hole 190 is disposed on alternating section 110 of platform 100, such that half the section 110 do not include a through hole 190. However, in another embodiment, through hole 190 may be disposed on every section 110.

Referring now to FIGS. 3a and 3b, each coupling mechanism 135 includes a fastener 134 with four through holes 133 and two receptacles or cutouts 136a, 136b with four boreholes 138. Each generally rectangular connector receptacle or cutout 136a, 136b is disposed on back face 130. One receptacle 136a is disposed proximal to left side 140 and one receptacle 136b is disposed proximal to right side 150. Both receptacles or cutouts 136a, 136b are disposed approximately halfway between top surface 160 and bottom face 120 and extend from side face 140, 150 to inner cutout edge 137b and axially extend along central axis 105 from upper cutout edge 137c down to lower cutout edge 137d. Back face 137a of cutouts 136a, 136b defines a plane that is parallel to the plane defined by back section face 130. Each cutout 136a, 136b has a height preferably between 0.5 and 2.2 inches, length preferably between 1.0 and 3.7 inches, and depth preferably between 0.1 and 1.0 inches. In an alternative embodiment, cutouts 136a, 136b need not be used and, instead, coupling mechanism 135 comprises fasteners 134 with through holes 133 that correspond to boreholes 138 and are secured with screws 132.

Referring now to FIG. 3b, each cutout 136a, 136b further comprises two boreholes 138 disposed orthogonal to and extending from back cutout face 137a. In the present embodiment, boreholes 138 are spaced equidistant between inside cutout edge 137b and platform section side face 140, 150 as well as equidistant between upper and lower cutout edges 137c, 137d. In another embodiment, boreholes 138 may be staggered between upper and lower cutout edges 137c, 137d to form a diagonal pattern. Each borehole 138 has a diameter preferably between 0.05 and 0.25 and a depth preferably between 0.1 and 1.0 inch.

Referring now to FIG. 3a, each connector or fastener 134 has a first rectangular side 134a releasably secured to platform section 110 and a second rectangular side 134b extending outward from first rectangular side 134a and left face 140, with the second side 134b not connected to a platform section 110. In the present embodiment, second side 134b would connect to cutout 136b disposed proximal to the right side 150 of an adjacent platform section 110 (not shown in FIG. 3a). First and second rectangular sides 134a, 134b are symmetrical about an axis defined by left edge 130c of back face 130. The angle between the plane defined by first side 134a and the plane defined by second side 134b is dependent on the number of platform sections 110 and is preferably between 120.0 and 150.0 degrees, and more preferably 135.0 degrees. Each connector side 134a, 134b has a height preferably between 0.25 and 2.0 inches, length preferably between 0.75 and 3.5 inches, and thickness preferably between 0.05 and 1.0 inch.

Each connector 134 further comprises four through holes 133 that align with bore holes 138 when connector 134 is placed in cutouts 136a, 136b. Connectors 134 may be employed as a standalone connector or in conjunction with any suitable fastener standard in the art, including but not limited to a bracket, latch, drawbolt, hinge, or clip. Whether used standalone or with other fasteners, connectors 134 are releasably secured to boreholes 138 in platform sections 110 with screws 132 or other suitable fasteners standard in the art; thus, securing adjacent platform sections 110 together. Though shown in FIGS. 3a and 3b as rectangular, cutouts 136a, 136b may be any suitable shape, including but not limited to circular, elliptical, square, semi-circular, or polygonal.

Figure 6A:
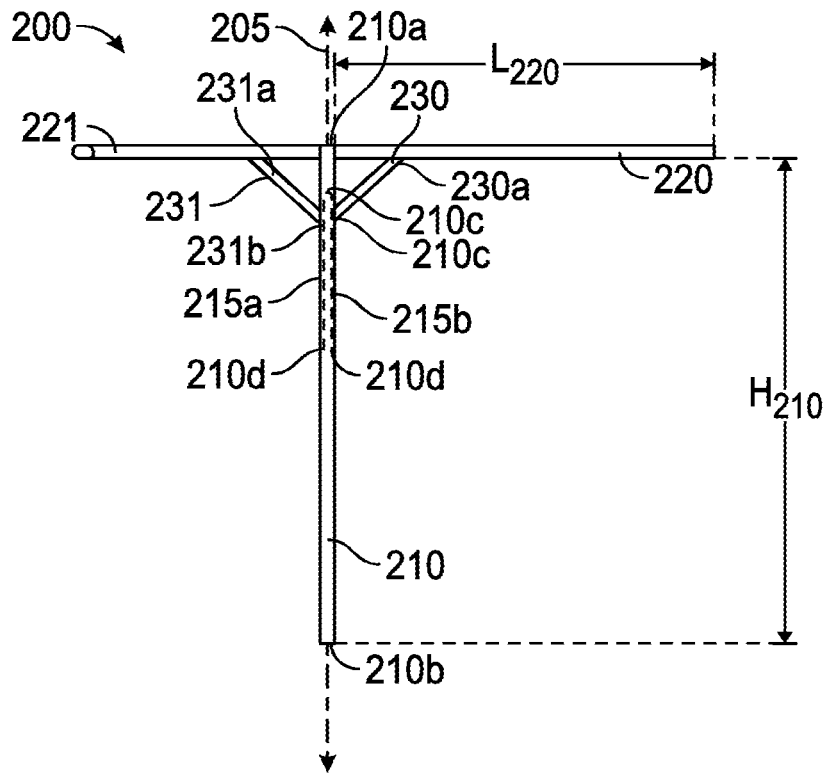
FIG. 6a is a side view of an embodiment of a safety device in accordance with the principles described herein for use with the locomotion platform of FIG. 1.
Figure 6B:
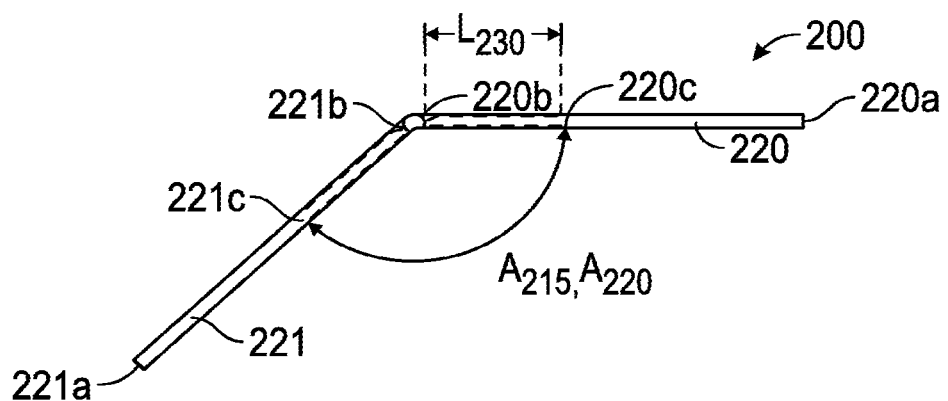

Referring now to FIGS. 6a and 6b, in this embodiment, safety assembly 200 includes a vertical member 210 with central axis 205, a pair of horizontal bars 220, 221 pivotally connected to vertical member 210, a pair of support bars 230, 231 pivotally connected to horizontal bars 220, 221 and slidingly connected to vertical member 210. Vertical member 210 is a bar with a top end 210a and a bottom end 210b, and has a semicircle cross section configured to mate and slidingly engage hole 190. Vertical member 210 has a height $H_{210}$ preferably between 24.0 and 48.0 inches, and more preferably between 30.0 and 42.0 inches, and a diameter or width (for non-circular shaped vertical member 210) preferably between ¾ and 1 inch.

Vertical member 210 also includes a first and second slot 215a, 215b with top slot end 210c disposed proximal to top end 210a and extending downward to bottom slot end 210d. First slot 215a is disposed at angle $A_{215}$ about central axis 205 from the second slot 215b. Angle A215 is dependent on the number of platform section 110 and preferably between 120 and 150 degrees, and more preferably 135 degrees. Each slot 215a, 215b further comprises a lip (not shown) such that the opening of recessed strips 215a, 215b is narrower than the interior of recessed strips 215a, 215b. Vertical member 210 may be made of any suitable material known in the art, including but not limited to metals or polymers.

Referring now to FIG. 6b, horizontal bars 220, 221 comprise an outside end 220a, 221a, respectively, an inside end 220b, 221b, respectively, and a support bar connection point 220c, 221c, respectively. In this embodiment, horizontal bars 220, 221 have a semicircle cross section; a length $L_{220}$, $L_{221}$ preferably between 15.0 and 28.0 inches, and more preferably between 18.0 and 24.0 inches; and a diameter or width (for non-circular shaped horizontal bars 220, 221) preferably between ¾ and 1 inch. Horizontal bars 220, 221 are pivotally connected to vertical member 210 at inside end 220b, 221b. In general, horizontal bars 220, 221 can be pivotally connected to vertical member 210 with a hinge, pin, or other suitable connector that allows horizontal bars 220, 221 to pivot at inside end 220b, 221b. Horizontal bars 220, 221 may be made of any suitable material known in the art, including but not limited to metals or polymers, but are preferably made of a metal or polymer bar that is covered with a shock-absorbing polymer, such as rubber.

Referring again to FIGS. 6a and 6b, support bars 230, 231 comprise a first end 230a, 231a and a second end 230b, 231b. In this embodiment, support bars 230, 231 have a circular cross section; a length $L_{230}$, $L_{231}$, respectively, preferably between 6.0 and 24.0 inches, and more preferably between 12.0 and 18.0 inches; and a diameter preferably between 0.5 and 1 inch. Support bars 230, 231 are pivotally connected to horizontal bars 220, 221, respectively, at first ends 230a, 231a, respectively. In general, support bars 230, 231 may be pivotally connected to horizontal bars 220, 221 with a hinge, pin, or other suitable connector that allows support bars 230, 231 to pivot at first end 230a, 231a. Support bars 230, 231 are slidingly connected to vertical member 210 at second ends 230b, 231b, respectively, which are retained in slots 215a, 215b, respectively, with protrusions or pins that are retained by the lip of slot 215a, 215b. Support bars 230, 231 may be made of any suitable material known in the art, including but not limited to metals or polymers.

A release button (not shown) is preferably provided on vertical member 210 proximal to top recess end 210c of vertical member 210. A coupling mechanism (not shown) is preferably provided on safety assembly 200 to work in conjunction with the release button. The release button and coupling mechanism may be made of any suitable material known in the art, including but not limited to metals or polymers.

Though safety system 200 is shown in the present embodiment as groupings of interconnected bars, safety system 200 may comprise any suitable system known in the art that helps prevent injury to the user from falling during usage of the locomotion system 10. For example, in other embodiments, safety system 200 may comprise a harness worn by the user and mounted to a stationary object.

In an unactuated state, horizontal bars 220, 221 and support bars 230, 231 are collapsed or folded down on approximately either side of vertical member 210. Second end 230b, 231b of each support bar 230, 231 is disposed proximal to bottom recess end 210d of vertical member 210. To actuate the horizontal bars 220, 221, the second end 230b, 231b of support bars 230, 231 slides axially upward along axis 205 within recess strip 215a, 215b until second end 230b, 231b engages the coupling mechanism. The upward movement of second end 230b, 231b raises horizontal bars 220, 221 from a vertical or subvertical position by pivoting at both the support bar 230, 231 connection (second end 230b, 231b) to horizontal bar 220, 221 and the horizontal bar connection (inside end 220b, 221b) to vertical member 210 to bring horizontal bars 220, 221 to a horizontal or near horizontal position. In the actuated state, horizontal bars 220, 221 are disposed orthogonal to central axis 205. In another embodiment, horizontal bars 220, 221 may be disposed at an angle that is greater than or less than 90 degrees from central axis 205.

Horizontal bars 220, 221 may be lowered by actuating the release button; thus, allowing the support bars 230, 231 to slide downward within recessed strips 215a, 215b along central axis 205. The downward movement of second end 230b, 231b lowers horizontal bars 220, 221 from a horizontal or subhorizontal position by pivoting at both the support bar 230, 231 connection (second end 230b, 231b) to horizontal bar 220, 221 and the horizontal bar connection (inside end 220b, 221b) to vertical member 210 to bring horizontal bars 220, 221 to a vertical or near vertical position.

Figure 7:
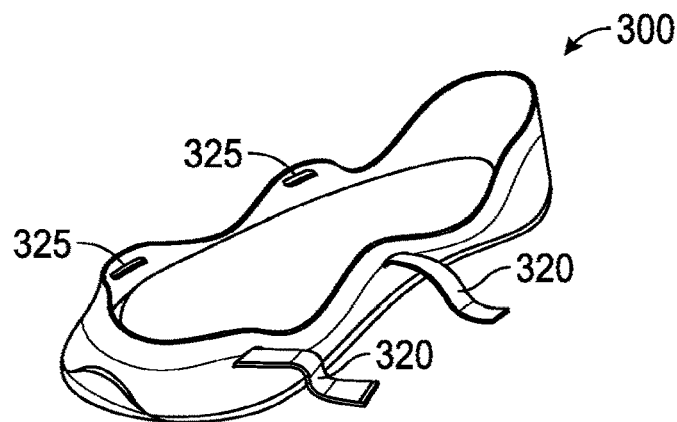
FIG. 7 is a perspective view of an embodiment of a foot covering in accordance with the principles described herein for use with the locomotion platform of FIG. 1.
Figure 8:
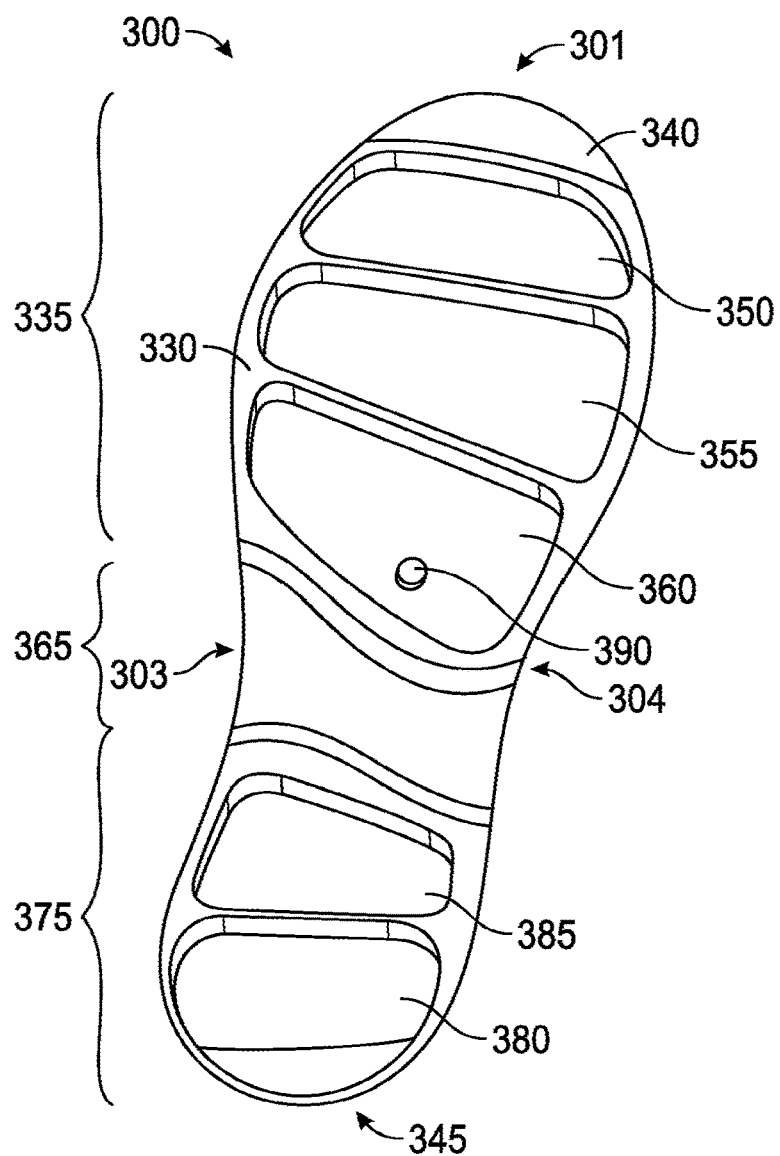
FIG. 8 is a bottom view of the foot covering of FIG. 7.

Referring to FIGS. 7 and 8, an embodiment of a foot covering 300 for use with embodiments of platforms described herein is shown. In this embodiment, foot coverings 300 comprise an upper portion 310, a pair of closure straps 320, a sole 330, a plurality of variable friction pads 340-360, 380-385, and an anchor pin 390. As used herein, the term "foot covering" refers to a shoe or an overshoe. An overshoe is a foot covering that at least partially covers the wearer's shoe and generally includes a sole and a means to attach the sole to the wearer's shoe or body (e.g., foot, ankle, or leg). Further, when used to describe foot covering 300, the terms "top" or "bottom" may be used for purposes of description with "up," "upper," "upward," or "above" meaning generally toward or closer to the end of foot covering 300 closest to the toe 301, and with "down," "lower," "downward," or "below" meaning generally toward or closer to the end of foot covering 300 closest to the heel 302. The overall length and width of foot covering 300 will vary depending on the size of the wearer's foot; thus, foot covering 300 may be customized to fit any sized foot.

Upper portion 310 of foot covering 300 generally covers a portion of or the entire upper part of the wearer's foot. In the present embodiment, upper portion 310 covers the toe 301, heel 302, and sides 303, 304 of the wearer's foot. Upper portion 310 may be made of any suitable material known in the art, including but not limited to fabric, leather, or other suitable material known in the art.

Referring now to FIG. 7, closure straps 320 and retainers 325 are disposed on opposite sides of upper portion 310. Closure straps 320 have a width preferably between 0.5 and 2.0 inches and length preferably between 6.0 and 12.0 inches long. Closure straps 320 extend over the top of the wearer's foot to retainer 325 disposed on opposite upper portion 310 side in which closure strap 320 originated. In this embodiment, retainer 325 comprises a slot through which closure strap 320 is threaded, allowing closure strap 320 to fold over itself and extend back toward upper portion 310 side in which closure strap 320 originated; hook and loop closures may be used on adjacent surfaces of closure straps 320 to secure closure straps 320. However, in general, other suitable retention mechanisms known in the art including, without limitation, a hook and loop fastener, buckle, button, snap, elastic closure, or shoelaces can be employed.

Referring again to FIGS. 7 and 8, sole 330 of foot covering 300 covers the underside of the wearer's foot and connects to upper portion 310 along the entire perimeter of the wearer's foot. In this embodiment, upper portion 310 and sole comprise one continuous piece of material.

Sole 330 comprises three sections—a forefoot 335, a midfoot 365, and a hindfoot 375. Forefoot section 335 includes toe friction pad 340 and a first, second, and third forefoot pad 350, 355, 360, respectively. Toe friction pad 340 is disposed on the bottom of sole 330 proximal to the toe 301 or the "top" of sole 330. Toe friction pad 340 extends from the top of toe 301 downward toward heel 302 preferably between 0.5 and 1.5 inches and from one side 303 across the entire width of sole 330 to the other side 304. First friction pad 350 is disposed on sole 330 below and proximal to toe friction pad 340 and extends downward toward heel 302 preferably between 1.0 and 3.0 inches and from one side 303 across the entire width of sole 330 to the other side 304. Second friction pad 355 is disposed on sole 330 below and proximal to first friction pad 350 and extends downward toward heel 302 preferably between 1.0 and 3.0 inches and from proximal to one side 303 across the entire width of sole 330 proximal to the other side 304. Third friction pad 360 is disposed on sole 330 below and proximal to second friction pad 355 and extends downward toward heel 302 preferably between 1.0 and 3.0 inches and from proximal to one side 303 across the entire width of sole 330 proximal to the other side 304. Though shown in the present embodiment with four friction pads 340, 350, 355, 360, in other embodiments, forefoot section 335 may comprise three or fewer friction pads of varying sizes. In yet other embodiments, forefoot section 335 may comprise five or more friction pads of varying sizes.

Still referring to FIG. 8, midfoot section 365 comprises the portion of the shoe covering 300 that supports the arch of the wearer's foot. As shown in FIG. 8, in this embodiment, midfoot section 365 does not comprise any friction pads. However, in other embodiments, midfoot section 365 may comprise one or more friction pads of varying sizes.

Hindfoot section 375 comprises heel friction pad 345 and a fourth and fifth hindfoot pad 380, 385, respectively. Heel friction pad 345 is disposed on the bottom of sole 330 proximal to the heel 302 or the lower end of sole 330. Heel friction pad 345 extends from the bottom of heel 302 upward toward toe 301 preferably between 0.5 and 1.5 inches and from one side 303 across the entire width of sole 330 to the other side 304. Fourth friction pad 380 is disposed on sole 330 above and proximal to heel friction pad 345 and extends upward toward toe 301 preferably between 1.0 and 3.0 inches and from one side 303 across the entire width of sole 330 to the other side 304. Fifth friction pad 385 is disposed on sole 330 above and proximal to fourth friction pad 380 and extends upward toward toe 301 preferably between 1.0 and 3.0 inches and from proximal to one side 303 across the entire width of sole 330 proximal to the other side 304. Though shown in the present embodiment with three friction pads 345, 380, 385, in other embodiments, hindfoot section 375 may comprise two or fewer friction pads of varying sizes. In yet other embodiments, hindfoot section 375 may comprise four or more friction pads of varying sizes.

All friction pads 340, 345, 350, 355, 360, 380, 385 have a thickness preferably between 0.1 and 1.0 inch. Though friction pads 340-360, 380-385 are shown in the present embodiment as extending from one side 303 across the entire width of sole 330 to the other side 304, in other embodiments friction pads 340-360, 380-385 may extend across only a portion of sole 330 between sides 303, 304. Friction pads 340-360, 380-385 may be made of any suitable material known in the art including, but not limited to, polymers, ceramics, rubber, fabric, fiber glass, or fur. Friction pads 340-360, 380-385 are preferably made of polyethylene or polytetrafluoroethylene, and more preferably made of high density polyethylene. In another embodiment, sole 330 may comprise a layer of fur instead of friction pads.

Figure 9:
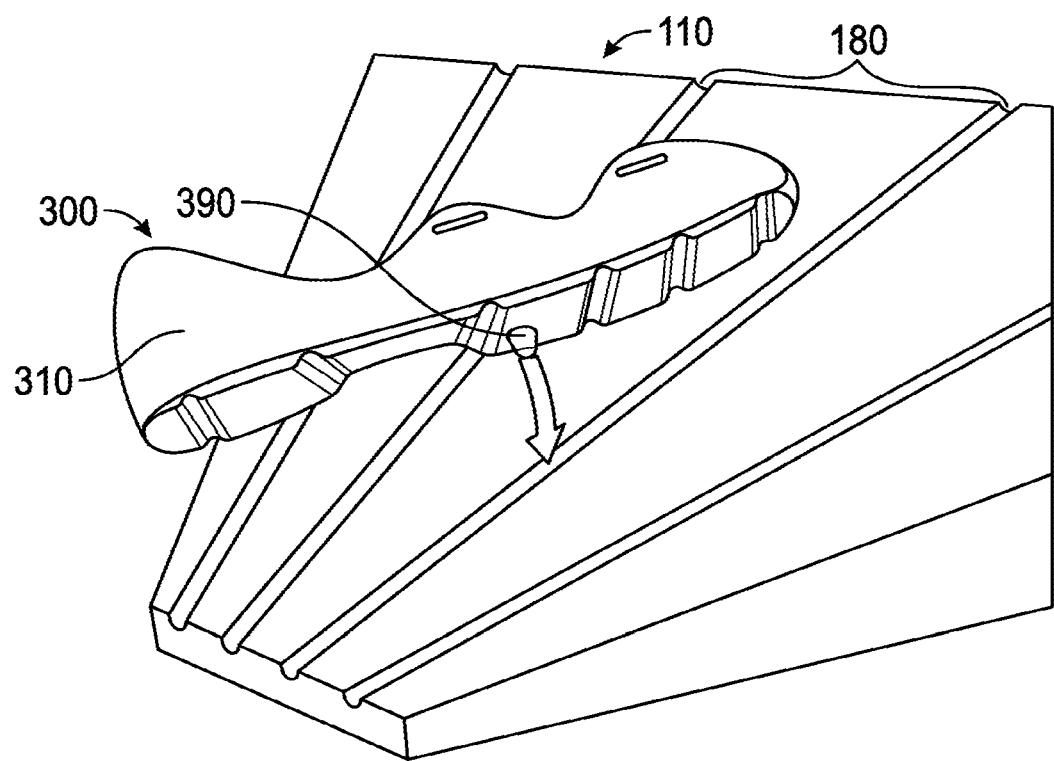
FIG. 9 is a perspective view of the foot covering of FIG. 7 and a portion of the locomotion platform of FIG. 1.

Referring now to FIGS. 8 and 9, shoe covering 300 further comprises an anchor pin 390 extending from the bottom surface of third friction pad 360 proximal to midfoot section 365. Anchor pin 390 has a diameter preferably less than ½ inch, and more preferably less than ¼ inch. Anchor pin 390 extends from third friction pad 360 away from sole 330 orthogonal from the plane defined by third friction pad 360 less than 1.0 inch, and more preferably between ⅛ and ¾ inch. In another embodiment, anchor pin 390 may be disposed on first or second friction pad 350, 355; on midfoot 365; on fourth or fifth friction pad 380, 385; or in between friction pads 340-360, 380-385. In yet another embodiment, anchor pin 390 may be spring-loaded and disposed in a circular housing such that in an unactuated state, the anchor pin 390 protrudes outside the housing and when pressure is placed on the anchor pin 390, pin 390 retracts into the housing. In yet another embodiment, sole 330 may comprise a plurality of anchor pins 390 that extend from or between various friction pads away from sole 330 orthogonal from the plane defined by the friction pad preferably less than 1.0 inch. Anchor pin 390 may be made of any suitable material known in the art including, but not limited to polymers, metals, ceramics, or rubber.

Referring now to FIGS. 3a, 3b, 6a, 6b, the safety assembly 200 interfaces with platform 100 at through holes 190. Bottom end 210b of vertical member 210 fits in through hole 190. In this embodiment, vertical member 210 has a semicircle cross section sized slightly smaller than the semicircle-shaped through hole 190 that is cut out of platform section 110. The semicircle shape of both the vertical member 210 and through hole 190 ensures the safety assembly is installed in only one orientation and prevents rotation of vertical member 210. Horizontal bar 220, when fully extended upward, is disposed parallel to back face 130 of platform section 110. Horizontal bar 221, when fully extended upward, is disposed parallel to back face 130 of adjacent platform section 110.

Referring now to FIGS. 8 and 9, the foot coverings 300 interface with platform 100 via the anchor pins 390 and friction pads 340-360, 380-385. Anchor pins 390 fit in channels 180, allowing the friction pads 340-360, 380-385 to contact the upper surface 160 of platform 100. Because upper surface 160 is inclined, the friction pads 340-360, 380-385 will slide downward toward the center zone 170 under the force of gravity. The ease or amount of sliding of the pads 340-360, 380-385 on platform surface 160 will depend on the coefficient of friction between the pads 340-360, 380-385 and surface 160. The coefficient of friction may vary depending on the material chosen for both the platform surface 160 and the pads 340-360, 380-385. Thus, the material for friction pads may be selected based upon the desired coefficient of friction.

Friction pads 340-360, 380-385 are preferably made of a material having a coefficient of dry friction with platform surface 160 less than or equal 0.40 or a coefficient of lubricated friction with platform surface 160 less than or equal to 0.25. Moreover, each friction pad 340360, 380-385 may, but need not have different coefficients of friction. Different coefficients of friction may be attained for different portions of the overshoe sole 330 by changing the materials of each friction pad 340-360, 380-385. Thus, the coefficient of friction of the individual friction pads 340-360, 380-385 may vary between each friction pad allowing the toe and heel friction pads 340, 345, for example, to have a greater coefficient of friction than the interior first, second, third, fourth, and fifth friction pads 350, 355, 360, 380, 385. Increasing the coefficient of friction between the toe and heel friction pads 340, 345 and the platform surface 160, allows for greater stability by reducing the sliding effect when either the heel strikes or the toe lifts off the platform surface 160.

The use of a lubricant can further decrease the coefficient of friction between the pads 340-360, 380-385 and platform surface 160. Lubricants standard in the art may be used, including but not limited to silicone wipes or oil-based sprays.

To utilize the locomotion system 10, the user dons the foot coverings 300 on both feet and steps onto the platform 100. If all the horizontal bars 220, 221 have been actuated or raised to their fully extended and horizontal position, the user will need to lower two horizontal bars 220, 221 whose outside ends 220a, 221a are proximal to each other by actuating the release button on each corresponding vertical member 210. The user can then step onto platform 100 and step onto the center zone 170. The user then actuates all horizontal bars 220, 221 that are not fully extended and horizontal or subhorizontal by sliding the second end 230b, 231b of each support bar 230, 231 upward until second end 230b, 231b engages the coupling mechanism. The user will then employ the virtual reality device of his/her choice. Once in the virtual environment, any movement in the physical world made by the user will translate to movement in the virtual world.

The user may exercise freedom of movement while on platform 100. When the user takes a first step with a first leg off the center zone 170 and onto the angled portion 161 of top surface 160, the anchor pin 390 on the underside of foot covering 300 engages a channel or groove 180 on angled surface 161. As the user takes a second step with his/her second leg, the force of gravity with the anchor pin 390, which is slightly smaller in diameter and shorter in length than each channel 180, guides the user's first foot down the incline of angled surface 161 toward center zone 170. The low coefficient of friction between the foot covering pads 340-360, 380-385 and the platform surface 160 allows the foot covering to slide on surface 160. The anchor pin 390 on the user's second foot covering 300 then engages a channel 180 and the process is repeated. The user is thus able to maintain continuous walking motion in the virtual world while only moving within the perimeter of platform 100.

While the user is walking on the locomotion platform 100, the anchor pin 390 may not always engage a channel 180 upon initial contact with the platform 100. When this occurs, the incline of angled surface 161 and the force of gravity will still cause the foot covering pads 340360, 380-385 to slide downward toward center zone 170. As the foot coverings 300 are sliding down angled surface 161, the anchor pin 390 will fall into a channel 180, further guiding the foot covering toward center zone 170. The anchor pin 390 will fall into a channel 180 because the space between the channels 180 is decreasing from the back edge 161b of angled surface 161 to center zone 170.

Figure 10:
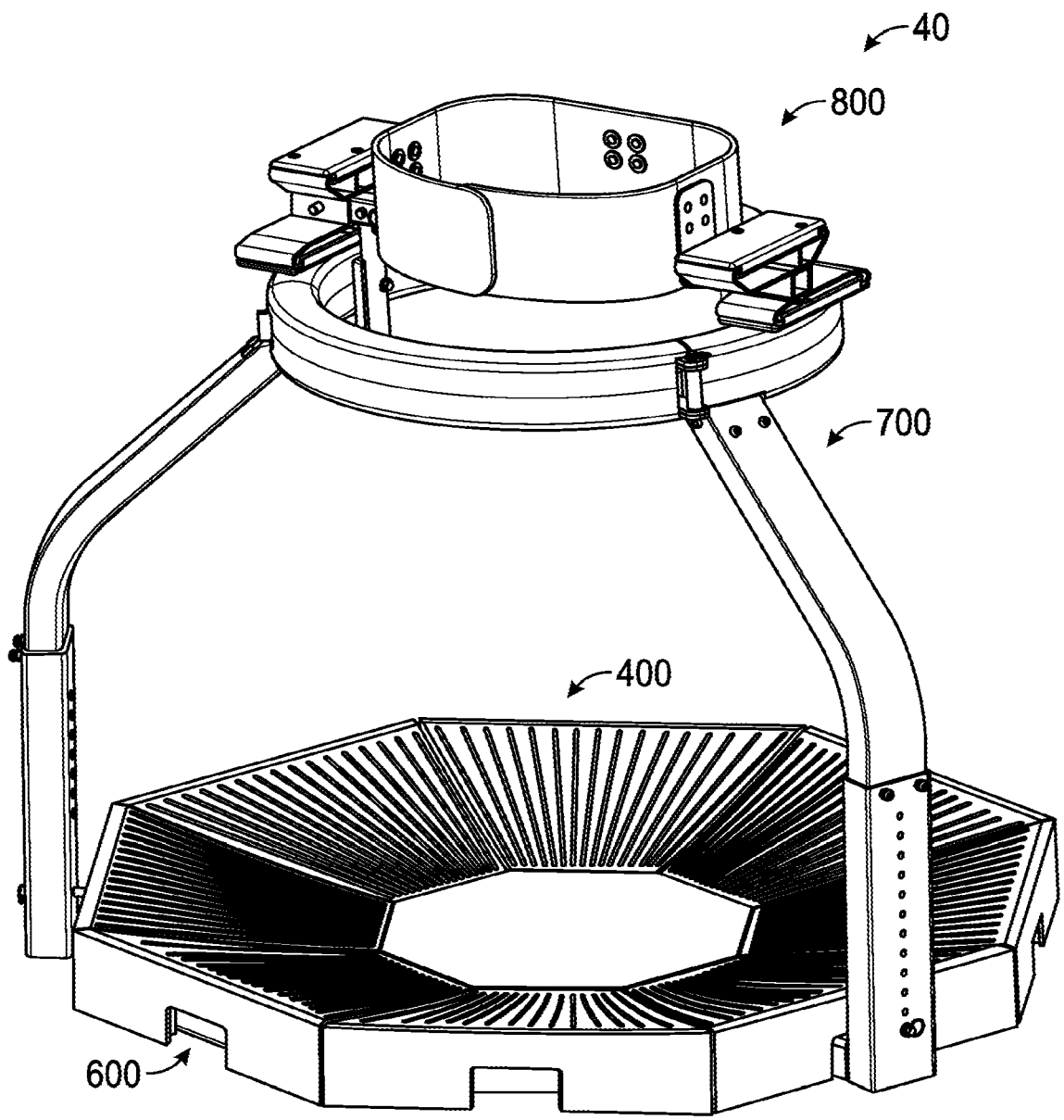
FIG. 10 is a perspective view of an embodiment of a locomotion system in accordance with the principles described herein.

Referring now to FIG. 10, another embodiment of a locomotion system 40 in accordance with the principles described herein is shown. In this embodiment, locomotion system 40 includes a platform 400, a platform connection structure 500 (shown in FIGS. 14 and 17a), a base 600, a harness support assembly 700, a safety harness 800, and variable-friction shoes or foot coverings 900 (shown in FIG. 22).

Figure 11:
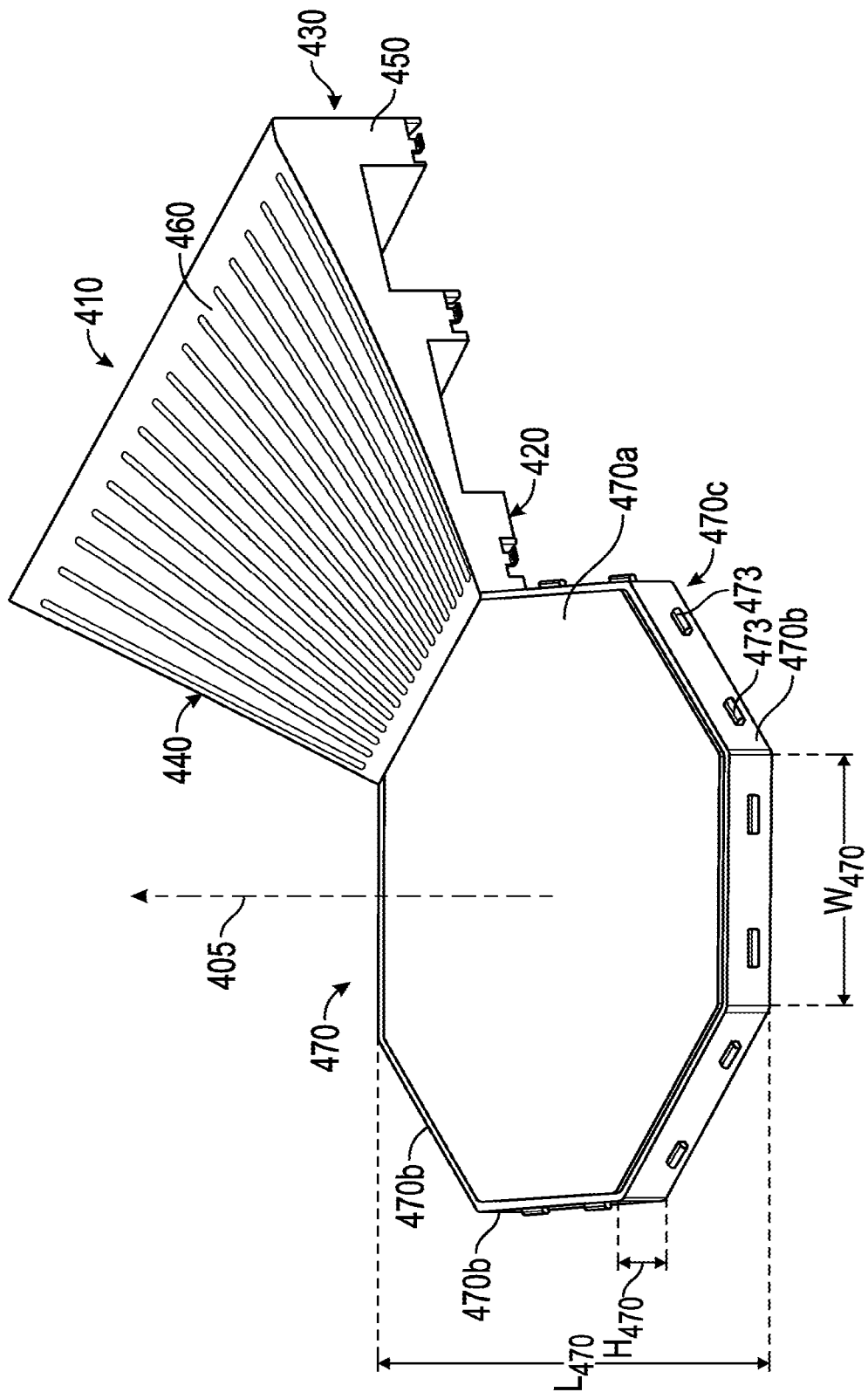
FIG. 11 is a perspective view of a center zone and a section of the locomotion platform of FIG. 31.

Referring now to FIG. 11, in this embodiment, platform 400 has a vertical central axis 405 and comprises eight circumferentially adjacent generally trapezoidal sections 410 disposed about a center section or zone 470. Each section 410 has a planar bottom or lower surface 420, a planar back face 430 opposite a planar inner face 475, a planar left side face 440, and a planar right side face 450, and a top or upper surface 460. Faces 430, 440, 450 extend perpendicularly upward from lower surface 420, and as will be described in more detail below, an outer portion of upper surface 460 is oriented at an acute angle relative to lower surface 420. Platform sections 410 are arranged circumferentially adjacent one another such that the entirety of each left face 440 abuts the entirety of a right face 450 of an adjacent section 410.

Center zone 470 comprises a top face 470a opposite a bottom face 470c and eight equilateral side faces 470b disposed at equal internal angles from each other. Since center zone 470 is both equilateral and equiangular, center zone 470 is a regular polygon—having all sides the same length that are symmetrically placed about a common central point. As previously described, platform sections 410 are disposed about center zone 470 such that the entirety of each inner face 475 abuts the entirety of a side face 470b of the center zone 470. Since all platform sections 410 are identical in this embodiment, platform 400 is also a regular polygon. Platform 400 preferably has a diameter or maximum horizontal width between 3.0 and 6.0 feet, and more preferably between 3.5 and 4.5 feet.

Because eight sections 110 are provided in this embodiment, when all platform sections 410 are properly aligned, platform 400 forms an octagonal shape. However, in other embodiments, different numbers of platform sections (e.g., sections 410) may be provided, resulting in different geometries for platform 400. For example, a platform having six circumferentially adjacent sections will have a hexagonal shape.

Referring now to FIGS. 12a, 12b, 13a, and 13b, each section 410 includes a plurality of channels or grooves 480 disposed on upper surface 460, two channels 490, 491 disposed on bottom surface 420, three extension loops 443 disposed on left side 440, three tabs 453 disposed on right side 450, and two slots 477 disposed on inner face 475. Sections 410 each have a length L410 (measured horizontally from inner face 475 to back face 430) preferably between 12.0 and 18.0 inches; a back width W410 (as measured horizontally along back face 430 between the left and right side faces 440, 450, respectively) preferably between 16.0 and 21.0 inches; an inner width W475 (as measured horizontally along inner face 475 between the left and right side faces 440, 450, respectively) preferably between 6.0 and 8.0 inches; a back height H410 (as measured vertically between the top and bottom faces 460, 420 along the back face 430) preferably between 2.0 and 12.0 inches; and an inner height H475 (as measured vertically between the top and bottom faces 460, 420 along the inner face 475) preferably between 0.2 and 2.0 inches. Each section 410 is constructed from a single material that has a low coefficient of friction, such as high density polyethylene, low density polyethylene, polyvinyl chloride, polypropylene, or any other suitable material with a low coefficient of friction.

Figure 12A:
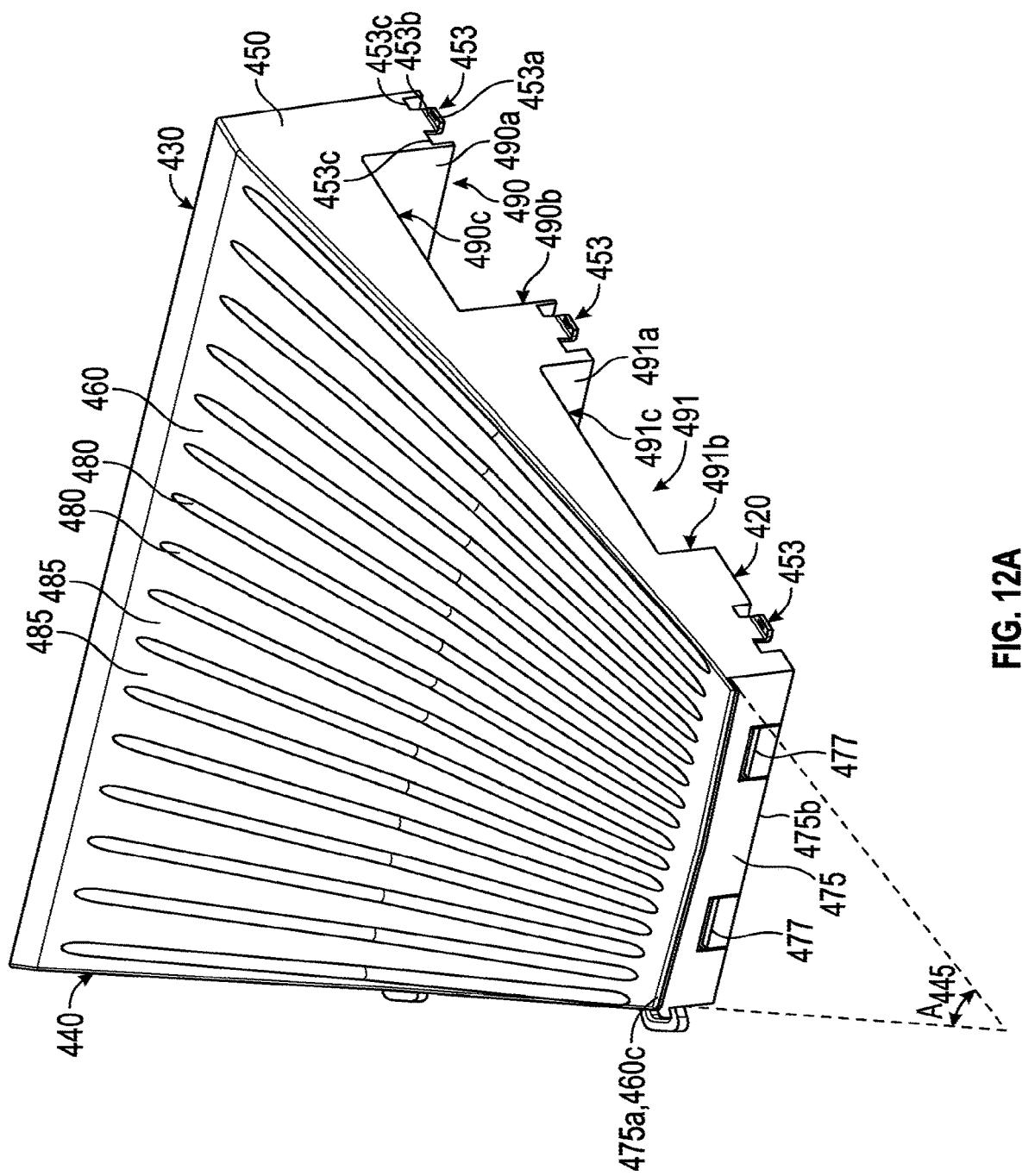
FIG. 12a is a perspective front view of a section of the locomotion platform of FIG. 31.
Figure 12B:
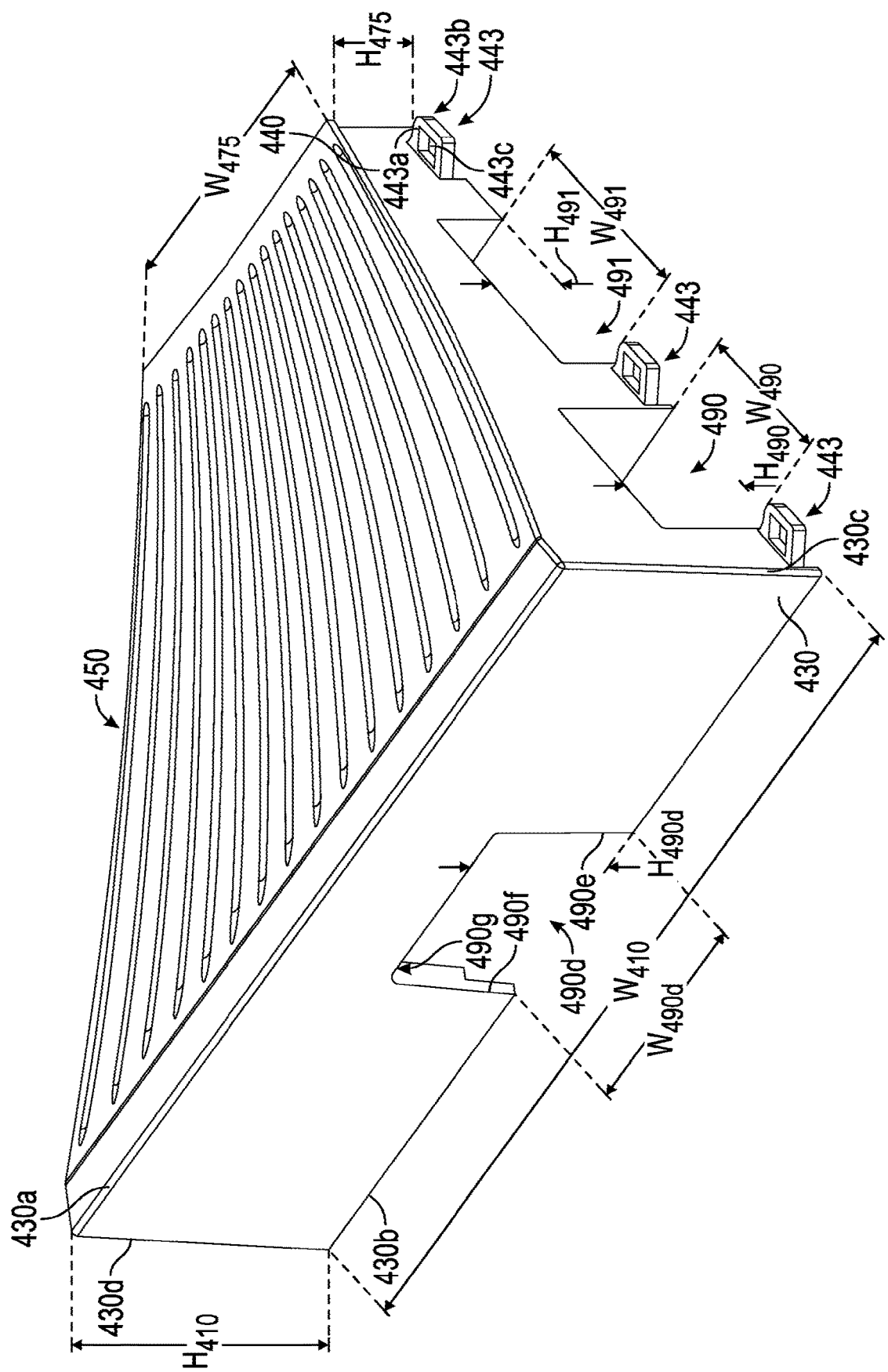
FIG. 12b is a perspective rear view of a section of the locomotion platform of FIG. 31.

Referring still to FIGS. 12a and 12b, bottom face 420 lies in a plane perpendicular to central axis 405, is trapezoidal with back face 430 parallel to inner face 475. When describing the individual sections 410 of platform 400, the terms "inner" and "outer" are used in reference to the assembled platform 400 as shown in FIG. 10 where the outer edges of the platform 400 coincide with the back face 430 of each section 410 and the center of platform 400 coincides with the center of center zone 470, which is coaxial with central axis 405.

Back face 430 lies in a plane oriented perpendicular to bottom face 420, extends from bottom face 420 axially upward to upper surface 460, and has upper edge 430a, lower edge 430b, left edge 430c, and right edge 430d. The left and right side faces 440, 450, also oriented perpendicular to bottom face 420, extend from left and right edges 430c, 430d, respectively, of back face 430 and terminate at inner face 475. Inner face 475 has upper edge 475a and lower edge 475b. In the present embodiment, the angle A445 between the left and right side faces 440, 450, respectively, is 45 degrees. It should be appreciated that angle A445 is dependent upon the number of sections 410 used to form platform 400. For example, as previously discussed, in an embodiment, platform 400 may be made up of six sections 410, then angle A445 would be 60 degrees. In another embodiment, platform 400 may be made up of nine sections 410 with an angle A445 of 40 degrees.

Figure 13A:
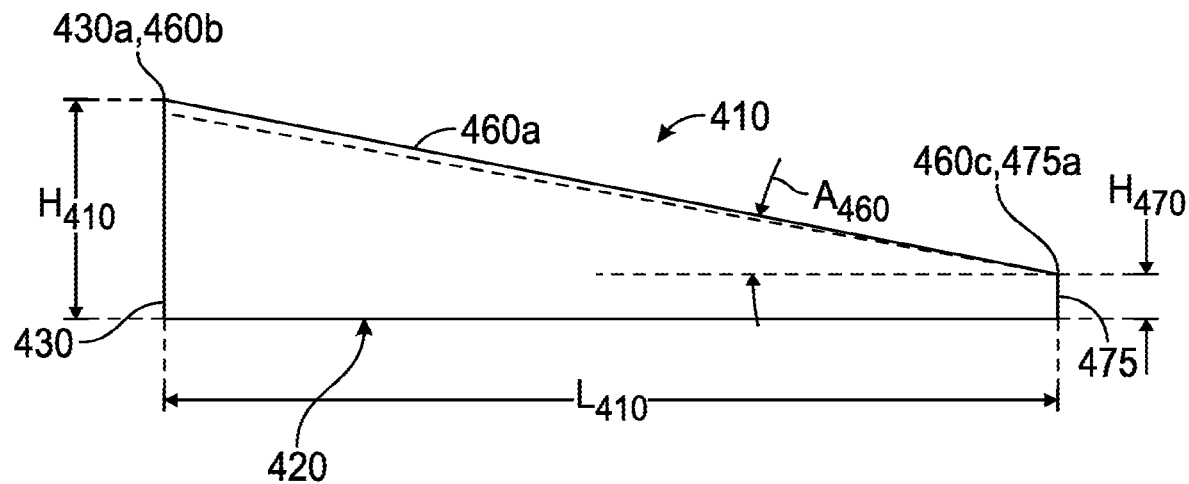
FIG. 13a is a side view of a section of the locomotion platform of FIG. 31.
Figure 13B:
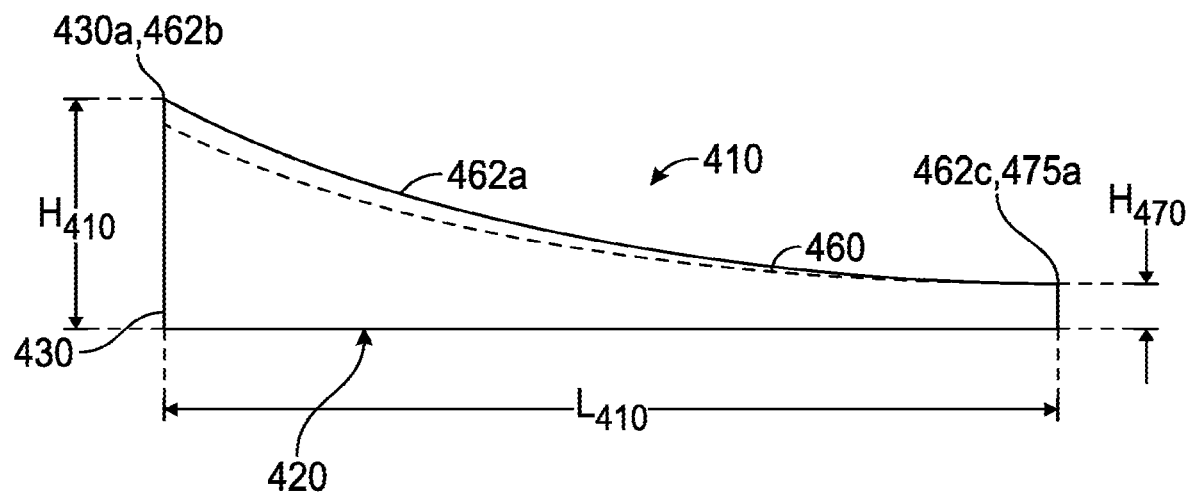
FIG. 13b is a side view of an alternative embodiment of a section of a locomotion platform in accordance with the principles described herein.

Referring now to FIGS. 13a and 13b, platform top surface 460 includes back edge 460b, which is coincident with back face edge 430a; and front edge 460c, which is coincident with inner upper edge 475a and parallel to back edge 460b. Top face 460 lies in a plane and extends from outer edge 430a, 460b radially inward and axially downward toward inner edge 460c, 475a such that the angle A460 between the plane defined by top face 460 and the plane defined by center zone top face 470a is preferably between 5.0 and 18.0 degrees. In an alternative embodiment, shown in FIG. 13b, top surface 460 comprises top face 462a, back edge 462b, which is coincident with back face edge 430a; and front edge 462c, which is coincident with inner upper edge 475a and parallel to back edge 460b. Top face 462a defines a curved surface that extends from outer edge 462b radially inward and axially downward toward inner edge 475a while bulging downward toward bottom face 420.

Referring now to FIG. 12a, top surface 460 also includes a plurality of channels or grooves 480 and ridges 485 that extend radially between back face 430 and inner edge 475. The channels 480 of the present embodiment may have any geometry previously described or shown in FIGS. 5a-5d. Like numbers are used to designate like parts. Further, the grooves 480 may become more shallow and tapered at the ends proximate the back face 430 and the inner face 475. In another embodiment, top surface 460 may include no channels or grooves and instead has a smooth surface.

Each section 410 preferably comprises 16-18 channels 480; however, the quantity of channels 480 will vary depending on the dimensions of each section 410 including the center zone 470 and the width of each channel 480. Similarly, the quantity of ridges 485 will also vary depending on the quantity and dimensions of the channels 480 as well as the dimensions of each section 410.

Referring now to FIGS. 12a and 12b, two channels or cutouts, an outer and inner channel 490, 491, respectively, are formed in bottom surface 420 and extend between and through the left and right side faces 440, 450, respectively. Channels 490, 491 are disposed parallel to each other and parallel to back and inner faces 430, 475, respectively. Outer channel 490 is disposed proximate the back face 430, and inner channel 491 is disposed proximate the inner face 475, each channel 490, 491 extending axially upward from bottom surface 420 toward upper surface 460. Outer channel 490 is generally T-shaped having a back face 490a opposite a front face 490b, and an upper surface 490c disposed between and connecting back and front faces 490a, 490b, respectively. Extension 490d of outer channel 490 is disposed on back face 430 and extends from lower edge 430b axially upward toward upper edge 430a, comprises left face 490e opposite right face 490f and an upper surface 490g disposed between and connecting left and right faces 490e, 490f, respectively. Extension 490d perpendicularly intersects back face 490a to form a T-shaped channel in bottom surface 420.

Outer channel 490 has a width W490 (as measured horizontally along bottom face 420 between the left and right side faces 490a, 490b, respectively) preferably between 5.0 and 7.0 inches; and a height H490 (as measured vertically between the bottom face 420 and upper surface 490c along the left face 440) preferably between 1.0 and 6.0 inches. Portion 490d of outer channel 490 has a width W49od (as measured horizontally along bottom face 420 between the left and right side faces 440e, 440f, respectively) preferably between 2.0 and 5.0 inches; and a height H49od (as measured vertically between the bottom face 420 and upper surface 490g along the back face 430) preferably between 1.0 and 6.0 inches. In the present embodiment, extension 490d of outer channel 490 is disposed approximately equidistant from left and right sides 440, 450, respectively. In other embodiments, extension 490d may be disposed closer to left side 440 or closer to right side 450.

Referring still to FIGS. 12a and 12b, inner channel 491 has a back face 491a opposite a front face 491b, and an upper surface 491c disposed between and connecting back and front faces 491a, 491b, respectively. Inner channel 491 has a width W491 (as measured horizontally along bottom face 420 between the left and right side faces 491a, 491b, respectively) preferably between 2.0 and 9.0 inches; and a height H491 (as measured vertically between the bottom face 420 and upper surface 491c along the left face 440) preferably between 0.2 and 2.0 inches. In the present embodiment, outer channel 490 has a smaller width W490 than width W491 of inner channel 491, and outer channel 490 has a larger height H490 than height H491 of inner channel 491. In other embodiments, outer channel 490 may have a larger width W490 than width W491 and/or a smaller height H490 than height H491. Further, channels 490, 491 may be distributed along left and right sides 440, 450, respectively, symmetrically or asymmetrically (shown). In other embodiments, only one channel may be used or more than two channels.

Referring now to FIG. 12b, three extension loops 443 are disposed on left side 440 proximate bottom surface 420. Each extension loop 443 has an upper face 443a opposite a lower face 443b, is generally cuboid, extends from left side 440 radially outward, and has a through hole 443c that extends from upper face 443a to lower face 443b. In the present embodiment, one extension loop 443 is disposed proximate back face 430, one extension loop 443 is disposed proximate inner face 475, and one extension loop 443 is disposed between the inner and outer channels 491, 490. In an alternative embodiment, two extension loops may be used in any combination of locations. In other embodiments, one or more extension loops may be employed.

Referring now to FIG. 12a, three tabs 453 are disposed on right side 450 proximate bottom surface 420. Each tab 453 comprises an L-shaped portion 453a disposed at the bottom of a body 453b that is coplanar with right side face 450, and the sides of body 453b being formed by cutouts 453c. L-shaped portion 453a extends axially outward away from right side face 450. In the present embodiment, one tab 453 is disposed proximate back face 430, one tab 453 is disposed proximate inner face 475, and one tab 453 is disposed between the inner and outer channels 491, 490. Each tab 453 on right side face 450 engages in an interlocking manner an extension loop 443 on left side face 440 of an adjacent platform section 410 until all tabs 453 have engaged all corresponding side face 450. In an alternative embodiment, two tabs may be used in any combination of locations. In other embodiments, one or more tabs may be employed.

Referring still to FIG. 12a, two coplanar slots 477 are disposed on inner face 475 approximately halfway between upper surface 460 and bottom surface 420 and each slot 477 extends axially outward from inner face 475, perpendicular to central axis 405, toward back face 430. In the present embodiment, one slot 477 is disposed proximate left side 440 and one slot 477 is disposed proximate right side 450. In an alternative embodiment, one or more slots 477 may be used in any combination of locations.

Referring now to FIG. 11, center zone top face 470a is parallel to bottom face 470c and both top and bottom faces 470a, 470c, respectively, lie in a plane oriented perpendicular to central axis 405. Center zone 470 has a length L470 (as measured horizontally between two opposed side faces 470b) preferably between 10.0 and 20.0 inches; a height H470 (as measured vertically between the top and bottom faces 470a, 470c) preferably between 0.2 and 2.0 inches; and each side face 470b has a width W470 (as measured between adjacent side faces 470b on the left and right) preferably between 3.0 and 8.0 inches. Though shown in the present embodiment parallel to bottom face 420, center zone top face 470a may be curved such that the portion of top face 470a that intersects central axis 405 is disposed axially below the intersection of top face 470a and side faces 470b.

Center zone 470 further comprises two tabs 473 on each side 470b. Each tab 473 extends outward orthogonally from side 470b. In the present embodiment, tabs 473 are disposed approximately halfway between the top and bottom faces 470a, 470c, respectively, and spaced apart horizontally. Tabs 473 are configured such that both tabs 473 slidingly engage into corresponding slots 477 disposed in inner face 475 of platform section 410. In other embodiments, tabs 473 may be disposed closer to either the top or bottom face 470a, 470c, respectively.

Figure 14:
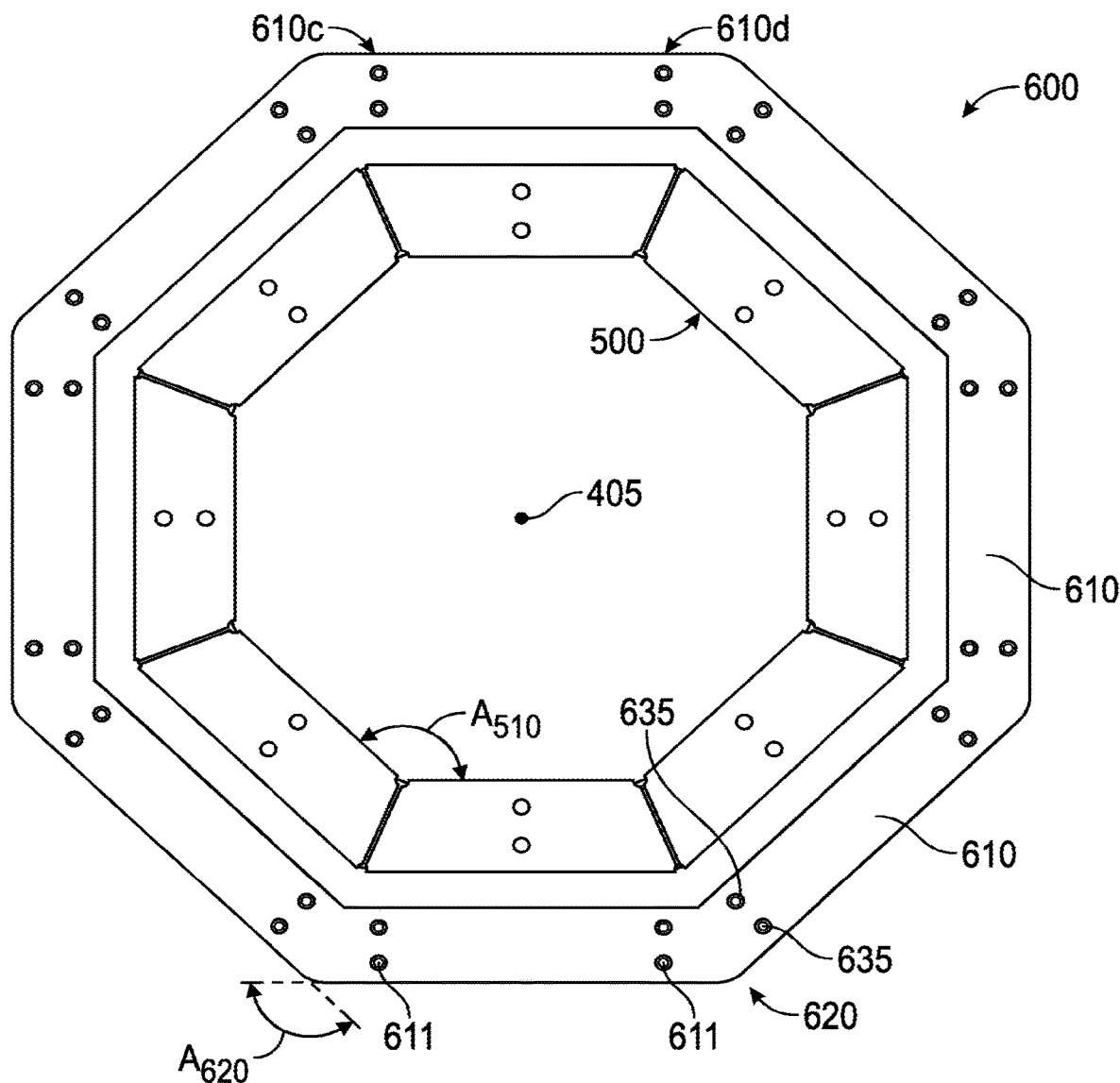
FIG. 14 is a top view of a platform connection structure and a base of the locomotion platform of FIG. 31.
Figure 15:
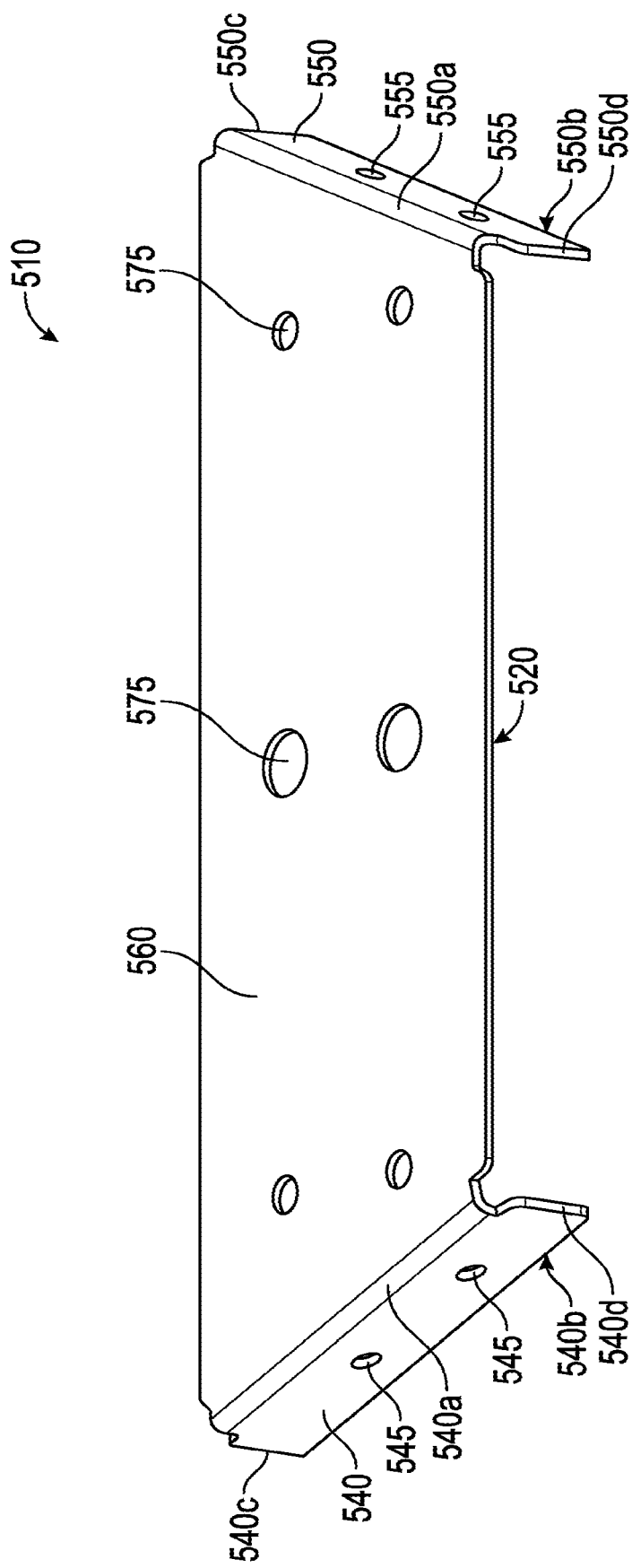
FIG. 15 is a perspective view of a portion of the platform connection structure of FIG. 35.
Figure 16:
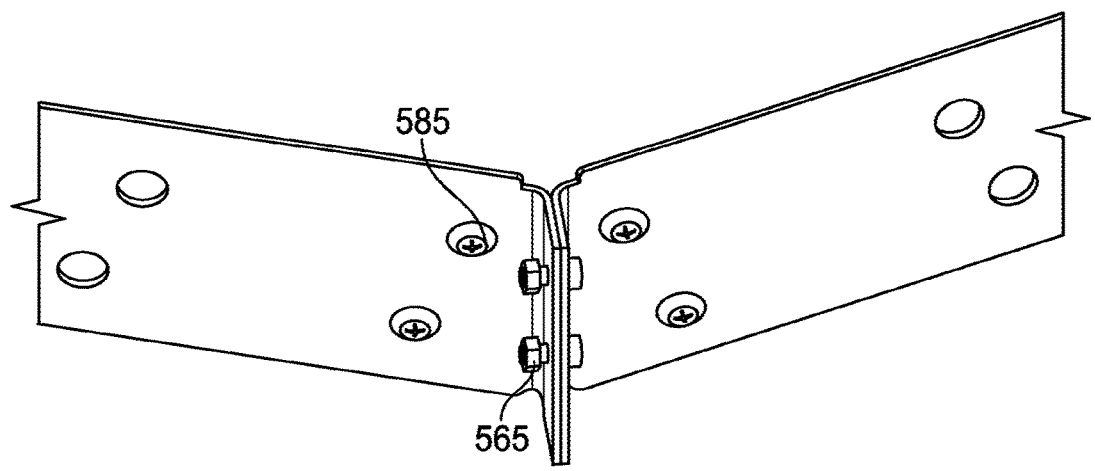
FIG. 16 is a perspective partial view of the platform connection structure of FIG. 35.

Referring now to FIGS. 14-16, platform connection structure 500 comprises eight circumferentially adjacent generally trapezoidal connection plates 510 disposed about central axis 405. Each plate 510 further comprises a top face 560 opposite a bottom face 520, a left side wall 540 and a right side wall 550. Plate 510 further comprises six through holes 575 distributed across top face 560 that extend axially downward through to bottom face 520. Through holes 575 may all have the same diameter or may have differing diameters. Through holes 575 allow fasteners 585 to pass therethrough. In general, any fastener known in the art, including but not limited to screws (shown in FIGS. 14 and 16), nuts and bolts, snap fit fasteners, and press fit fasteners may be used. Connection plates 510 may be made of any suitable material known in the art, including but not limited to metals or polymers.

Each plate 510 is configured to fit within inner channel 491 such that top face 560 of connection plate 510 abuts inner channel upper surface 491c, left side wall 540 of connection plate 510 is disposed proximate left side face 440 of platform section 410, and right side wall 550 of connection plate 510 is disposed proximate right side face 450 of platform section 410. Fasteners 585 then secure plate 510 to platform section inner channel 491.

Still referring to FIGS. 14-16, left side wall 540 comprises an upper edge 540a opposite a lower edge 540b, and a back edge 540c opposite an inner edge 540d. Left side wall 540 extends axially downward from top face 560 to lower edge 540b, and has two through holes 545 disposed approximately halfway between upper and lower edges 540a, 540b, respectively. In the present embodiment, through holes 545 are approximately equidistantly distributed horizontally across left side wall 540. In other embodiments, through holes 545 may be positioned in any suitable configurations known in the art.

Similarly, right side wall 550 comprises an upper edge 550a opposite a lower edge 550b, and a back edge 550c opposite an inner edge 550. Right side wall 550 extends axially downward from top face 560 to lower edge 550b, and has two through holes 555 disposed approximately halfway between upper and lower edges 550a, 550b, respectively. In the present embodiment, through holes 555 are approximately equidistantly distributed horizontally across left side wall 550. In other embodiments, through holes 555 may be positioned in any suitable configurations known in the art.

Still referring to FIGS. 14-16, through holes 545, 555 are positioned on left and right side walls 540, 550, respectively, such that when a left side wall 540 of one connection plate 510 abuts a right side wall 550 of another connection plate 510, through holes 545, 555 on both the left and right side walls 540, 550, respectively, are aligned and allow a fastener 565 to pass therethrough. Any fastener known in the art, including but not limited to nut and bolt fasteners (shown in FIG. 16), screws, snap fit fasteners, and press fit fasteners may be used. After each plate 510 is installed in platform section inner channel 491 and secured with fasteners 585, as previously described, each plate left side wall 540 is secured to the plate right side wall 550 of an adjacent platform section 410 until all platform section 410 are secured together.

In the present embodiment, the angle A510 between the adjacent connection plates 510 is 135 degrees. It should be appreciated that angle A510 is dependent upon the number of connection plates 510 used to form platform connection structure 500. For example, in an embodiment, platform connection structure 500 may be made up of six sections 510, then angle A510 would be 120 degrees. In another embodiment, platform connection structure 500 may be made up of nine sections 510 with an angle A510 of 140 degrees.

Figure 17A:
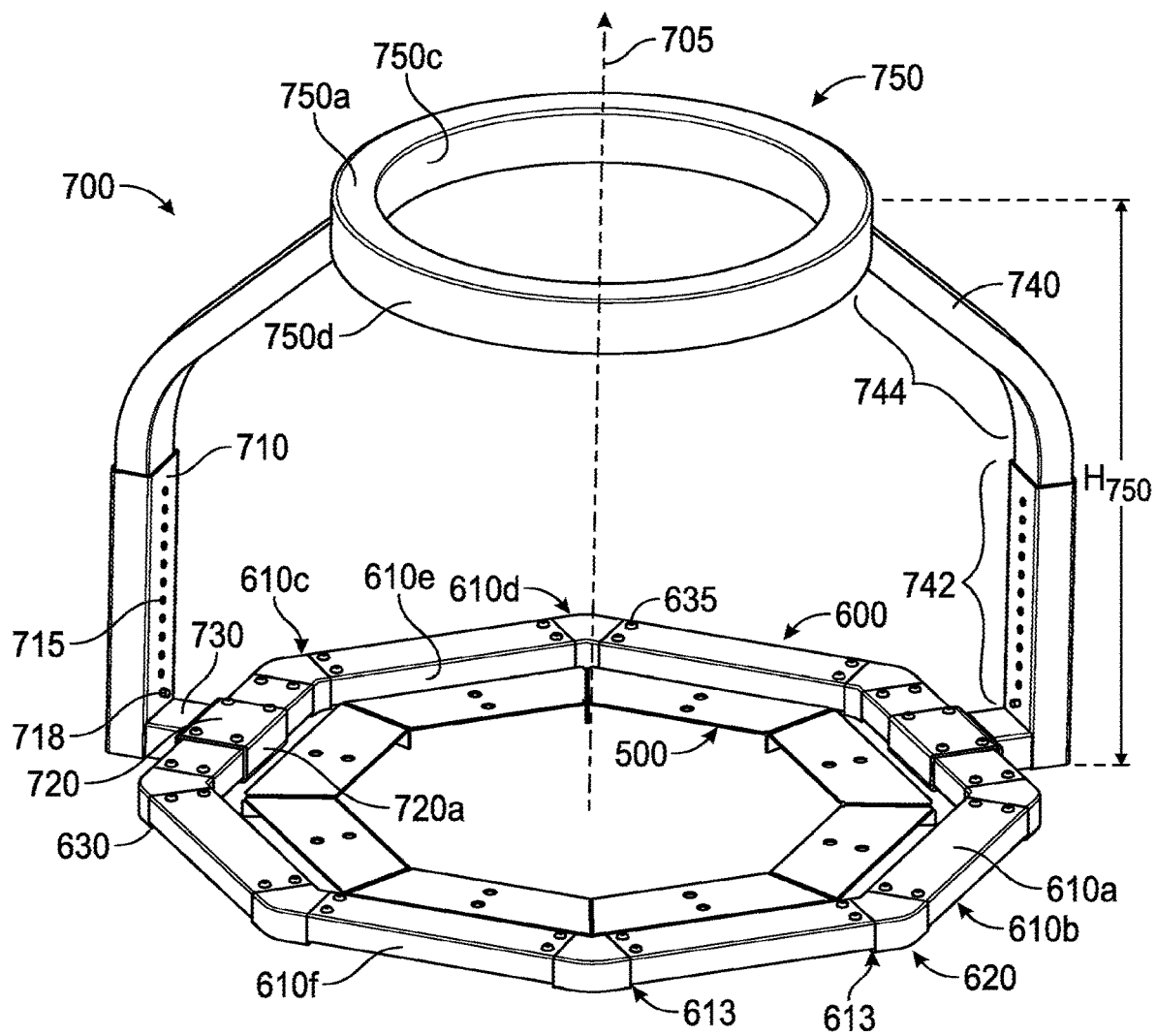
FIG. 17a is a perspective partial view of locomotion platform of FIG. 31.

Referring now to FIGS. 14 and 17a, base 600 comprises eight tubular members 610 having a rectangular cross section and connected to each other with eight angular connectors 620 and fasteners 635. Each tubular member 610 has an upper face 610a opposite a bottom face 610b, a left end 610c opposite a right end 610d, and an inside face 610e opposite an outside face 610f. Each tubular member 610 has two bore holes 611 disposed on upper face 610a proximate left end 610c and two bore holes 611 disposed on upper face 610a proximate right end 610d. All tubular members 610 generally have the same overall dimensions, including the dimensions positioning the boreholes 611. Tubular member 610 may be made of any suitable material known in the art, including but not limited to metals or polymers.

Figure 18:
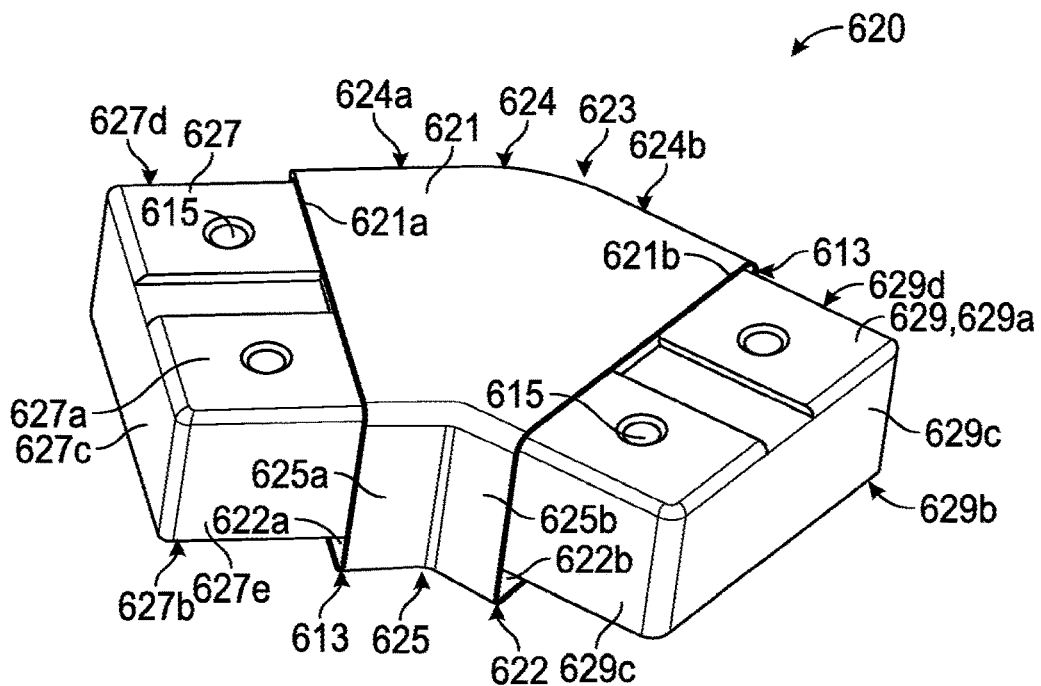
FIG. 18 is a perspective view of a portion of the base of FIG. 35.
Figure 19:
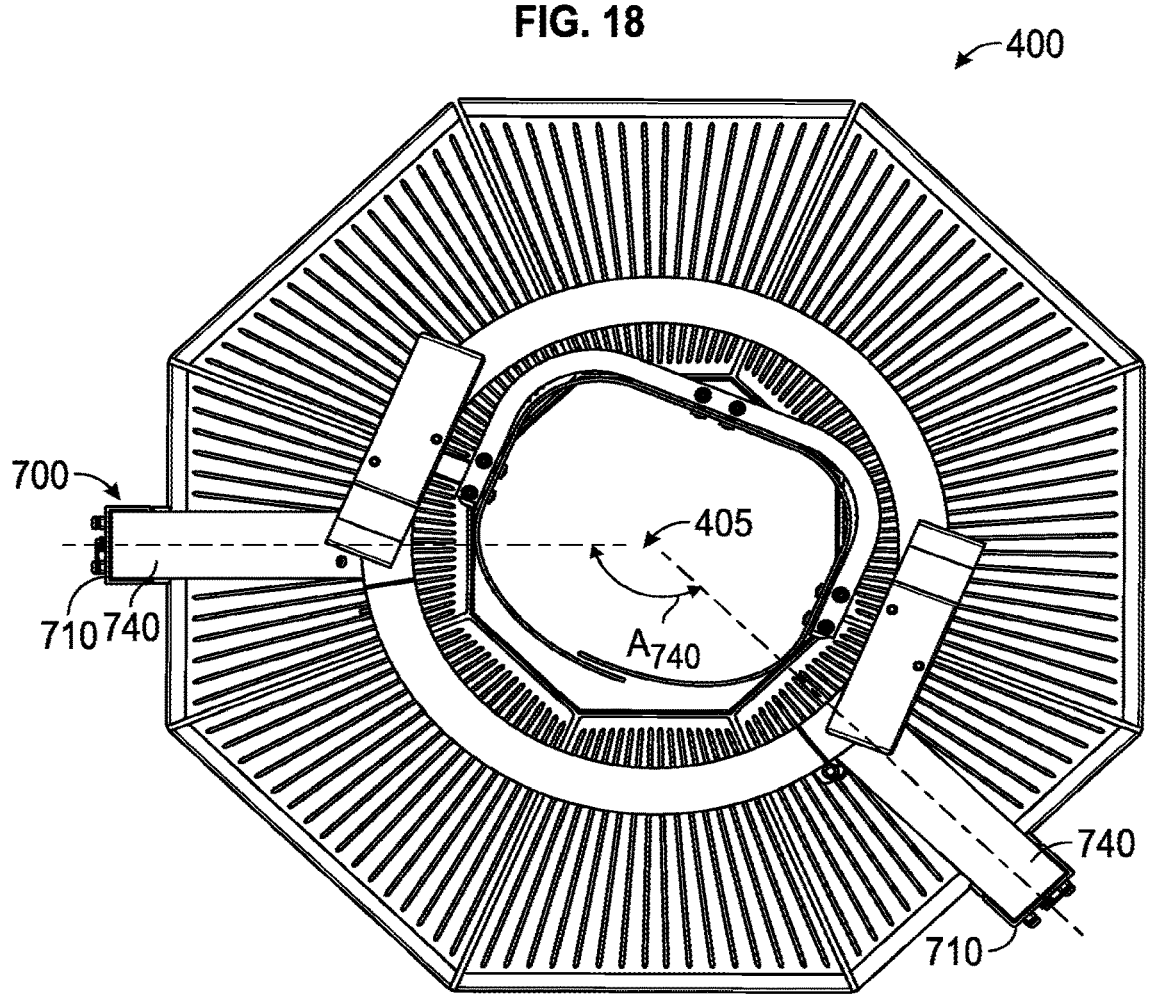
FIG. 19 is a top view of the system of FIG. 31.
Figure 20:
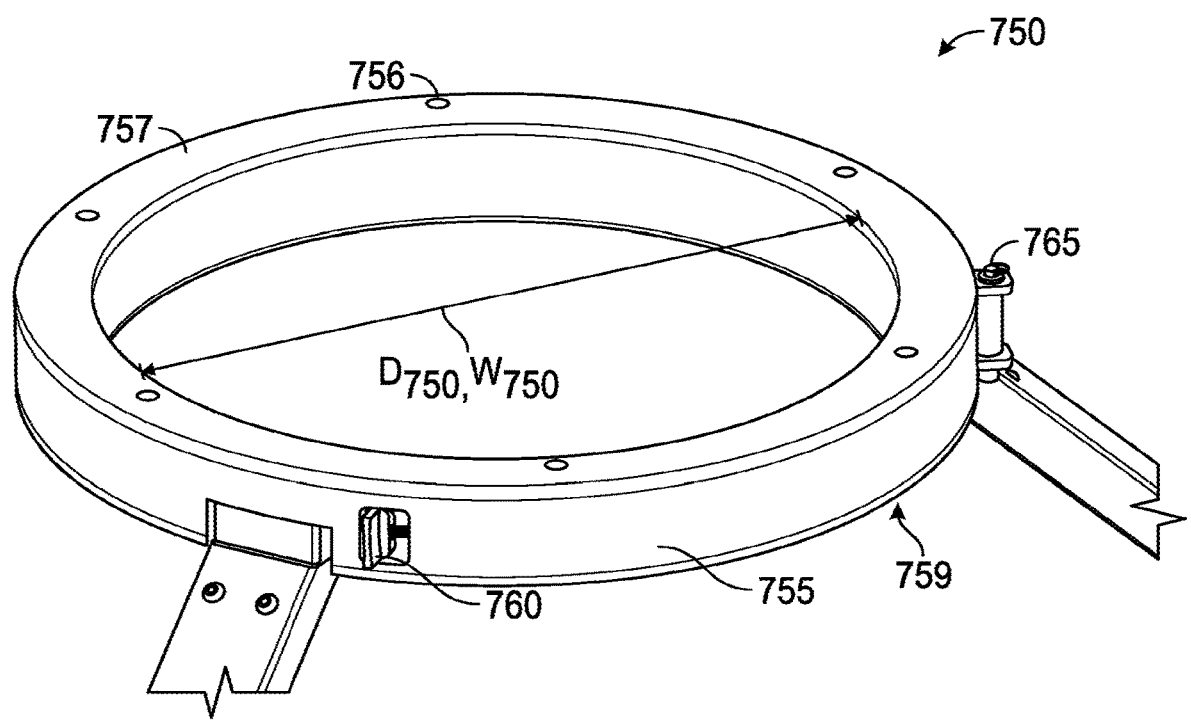
FIG. 20 is an enlarged perspective view of the support ring of locomotion system of FIG. 31.
Figure 21:
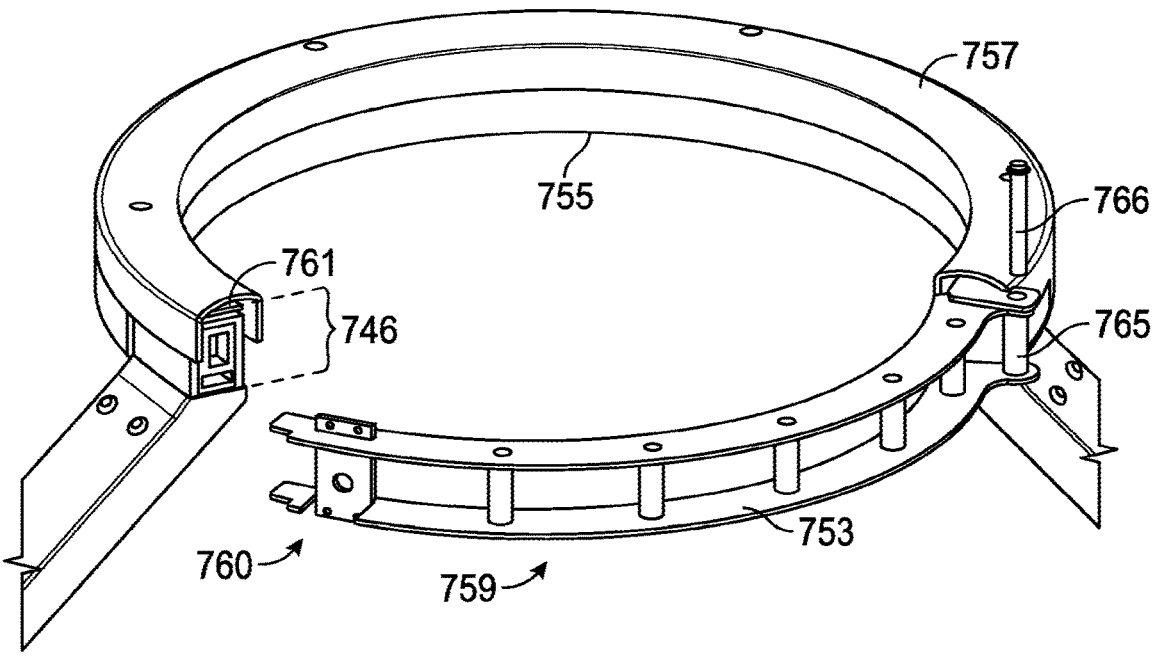
FIG. 21 is a perspective partial view of the support ring of FIG. 41.

Referring now to FIG. 18, each angular connector 620 comprises a central angular body 623, a generally cuboid left insert 627, a generally cuboid right insert 629, and a foot pad 630 (see FIG. 17a). Central angular body 623 has a top face 621 opposite a bottom face 622, an outer angular side 624 having a left half 624a and a right half 624b, and an inner angular side 625 having a left half 625a and a right half 625b. Body top face 621 has a left edge 621a and a right edge 621b; and body bottom face 622 has a left edge 622a and a right edge 622b. Angular connector 620 may be made of any suitable material known in the art, including but not limited to metals or polymers. Foot pad 630 may be made of any suitable material known in the art, including but not limited to rubbers or polymers.

Referring now to FIGS. 14 and 18, in the present embodiment, the angle A624 of the bend in each angular connector 620 (i.e., the angle A624 between the left half 625a and right half 624b of angular side 624) is 135 degrees. It should be appreciated that angle A624 is dependent upon the number of tubular members 610 used to form base 600. For example, in an embodiment, base 600 may be made up of six tubular members 610, then angle A624 would be 120 degrees. In another embodiment, base 600 may be made up of nine tubular members 610 with an angle A624 of 140 degrees.

Left insert 627 has a top face 627a opposite a bottom face 627b, an end face 627c disposed orthogonal to and extending between top and bottom faces 627a, 627b, respectively, and an outer side face 627d opposite inner side face 627e disposed orthogonal to and extending between top and bottom faces 627a, 627b, respectively. Left insert 627 further comprises two bores 615 in top face 627a disposed approximately halfway between left edge 621a and end face 627c; one bore 615 disposed proximate outer side face 627d, and one bore disposed proximate inner side face 627e. Further, left insert 627 has slightly smaller dimensions such that a lip 613 is formed around the entire interface between the left insert 627 and the central angular body 623 (i.e., lip 613 is formed at the interfaces of (1) top face 627a and left edge 621a; (2) bottom face 627b and left edge 622a; (3) outer side face 627d and outer angular left half 624a; and (4) inner side face 627e and inner angular left half 625a).

Referring now to FIG. 18, right insert 629 has a top face 629a opposite a bottom face 629b, an end face 629c disposed orthogonal to and extending between top and bottom faces 627a, 627b, respectively, and an outer side face 629d opposite inner side face 629e disposed orthogonal to and extending between top and bottom faces 627a, 627b, respectively. Right insert 629 further comprises two bores 615 in top face 629a disposed approximately halfway between right edge 621b and end face 629c; one bore 615 disposed proximate outer side face 629d, and one bore disposed proximate inner side face 629e. Further, right insert 629 has slightly smaller dimensions such that a lip 613 is formed around the entire interface between the right insert 629 and the central angular body 623 (i.e., lip 613 is formed at the interfaces of (1) top face 629a and right edge 621b; (2) bottom face 629b and right edge 622b; (3) outer side face 629d and outer angular right half 624b; and (4) inner side face 629e and inner angular right half 625b).

Referring still to FIGS. 14 and 18, in the present embodiment, the left and right inserts 627, 629, respectively, of each angular connector 620 slidingly engage the right and left ends 610d, 610c, respectively, of each tubular member 610, such that an octagon shape is formed. Each left insert 627 is configured to slide into a tubular right end 610d, such that bores 611 of tubular members 610 align with bores 615 of angular connector 620. A fastener 635 is then inserted into the aligned bores 611, 615 to secure the angular connector 620 to the tubular member 610. The right inserts 629 are similarly configured to slide into the tubular left end 610c, such that bores 611 of tubular members 610 align with bores 615 of angular connector 620. A fastener 635 is then inserted into the aligned bores 611, 615 to secure the angular connector 620 to the tubular member 610. Any fastener known in the art, including but not limited to screws (shown in FIGS. 14, 17a, and 17b), snap fit fasteners, and press fit fasteners may be used. In an alternative embodiment, angular connectors 620 are welded to tubular members 610. In the present embodiment, after all the fasteners 635 are in place and the angular connectors 620 are secured to the ends of tubular members 610, platform 400 can then be placed on base 600, such that base 600 is disposed in platform channel 490.

In the present embodiment, the interface between the inserts 627, 629 and the central angular body 623 provides a lip 613; however in other embodiments, angular connector 620 need not comprise a lip. In the present embodiment, foot pads 630 are disposed on the bottom of angular connectors; however, in other embodiments, foot pads may be disposed on the bottom of platform sections 410, center zone 470, or any combination thereof.

Figure 17B:
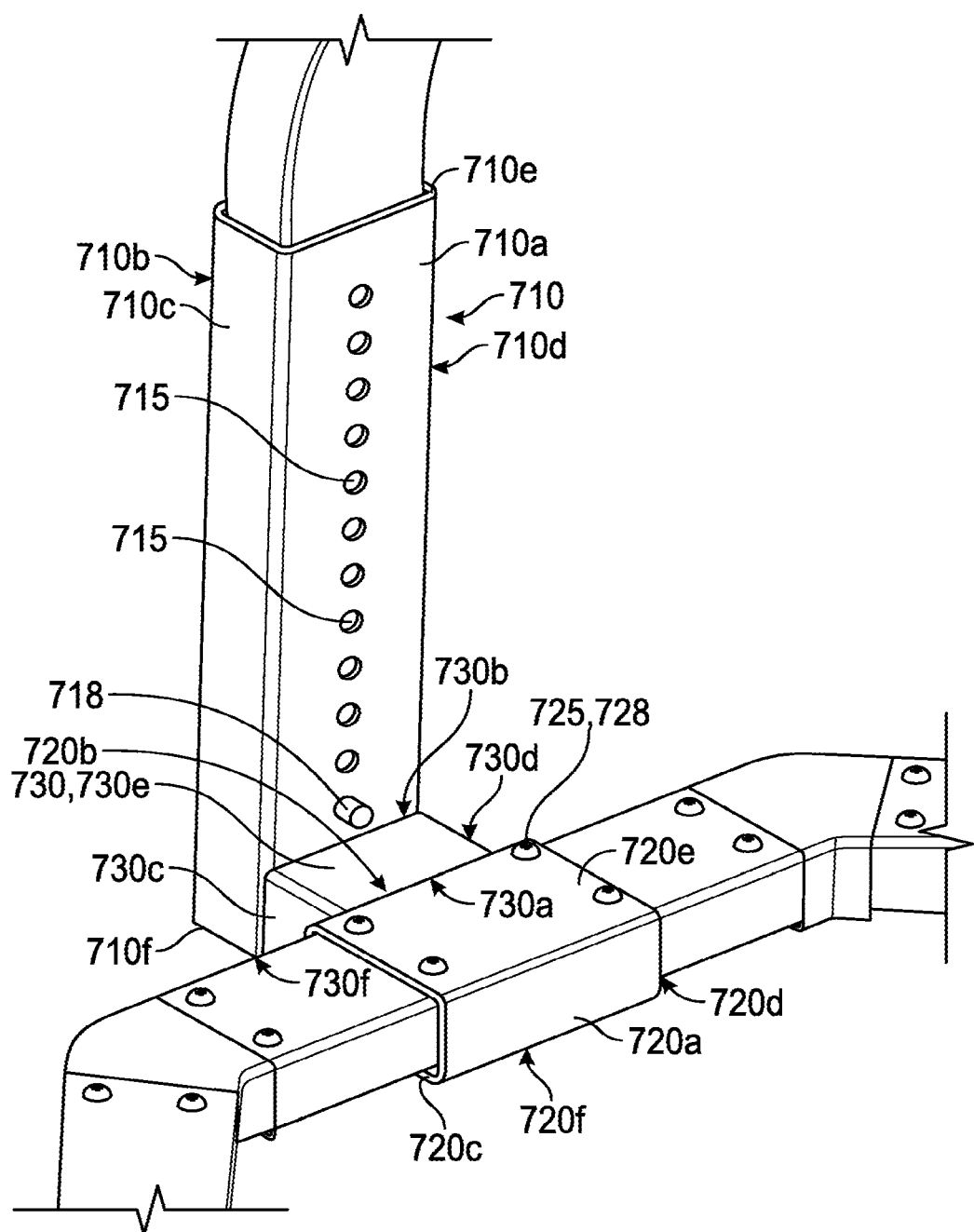

Referring now to FIGS. 17a and 17b, in this embodiment, harness support assembly or safety harness support structure 700 includes a pair circumferentially-spaced vertical members 710, a pair of base interfaces 720 coupling structure 700 to base 600, a pair of connecting beams 730 extending between interfaces 720 and members 710, a pair adjustable height beams 740 telescoping from members 710, and a support band or halo 750 disposed between beams 740. Each vertical member 710 is cuboid, tubular, and has an inside face 710a opposite an outside face 710b, a left face 710c opposite a right face 710d, and an open top face 710e opposite an open bottom face 710f. Vertical members 710 further comprise a plurality of through holes 715 that extend between and through the inside and outside faces 710a, 710b, respectively. Through bores 715 are disposed horizontally halfway between left and right faces 710c, 710d, respectively, and are vertically spaced evenly apart. Vertical members 710 may be made of any suitable material known in the art, including but not limited to metals or polymers.

Each base interface 720 is cuboid, tubular, and has an inside face 720a opposite an outside face 720b, an open left face 720c opposite an open right face 720d, and a top face 720e opposite a bottom face 720f. Base interfaces 720 further comprise four bores 725 that extend axially downward from top face 720e, each bore 725 disposed proximate one of the four corners of top face 720e. The dimensions of base interface 720 are slightly larger than that of tubular member 610 to allow base interface 720 to slide over tubular member 610. Fasteners 728 secure base interface to base tubular member 610. Base interfaces 720 may be made of any suitable material known in the art, including but not limited to metals or polymers. Any fastener known in the art including, but not limited to, nut and bolt fasteners, screws (shown in FIGS. 17a and 17b), snap fit fasteners, and press fit fasteners may be used. In an alternative embodiment, base interfaces 720 are welded to tubular members 610.

Referring still to FIGS. 17a and 17b, vertical tubular 710 is connected to base interface 720 through connecting beam 730. Connecting beam 730 is cuboid and has an inside face 730a opposite an outside face 730b, a left face 730c opposite a right face 730d, and a top face 730e opposite a bottom face 730f. Connecting beam outside face 730b is connected to vertical tubular inside face 710a and connecting beam inside face 730a is connected to base interface outside face 720b. Connecting beam 730 may be connected to vertical tubular 710 and base interface 720 using any fastening means known in the art, including but not limited to welding, nut and bolt fasteners, screws, snap fit fasteners, and press fit fasteners. In another embodiment, vertical tubular 710, connecting beam 730, and base interface 720 may be monolithic or formed from one piece of material. Connecting beam 730 may be tubular or solid and may be made of any suitable material known in the art, including but not limited to metals or polymers.

Each adjustable height beam 740 is tubular and comprises three portions—an adjustor portion 742, an angled portion 744, and a ring interface portion 746. Adjustor portion 742 is cuboid, tubular, and has an inside face 742a opposite an outside face 742b, a left face 742c opposite a right face 742d, and an open bottom face 710f. Each adjustable portion 742 further comprises a plurality of through holes 745 that extend between and through the inside and outside faces 742a, 742b, respectively. Through bores 715 are disposed horizontally halfway between left and right faces 742c, 742d, respectively, and are vertically spaced evenly apart. Adjustor portion 742 is disposed inside vertical tubular 710 and through holes 745 are positioned on adjustor portion 742 such that the vertical distance between each through hole 745 is equivalent to the vertical distance between the through holes 715 in vertical tubular 710, whereby the raising or lowering of adjustable height beam 740 in vertical tubular 710 allows through holes 715, 745 to become aligned. Once through holes 715, 745 of the vertical tubular 710 and the adjustable portion 742, respectively, are aligned, a locking mechanism 718 can be inserted in through the aligned through bores 715, 745. Angled portion 744 is tubular and extends axially upward and radially inward from adjustor portion 742 toward support halo 750. Ring interface portion 746 extends axially upward from the top of angled portion and is connected to support halo 750. Ringer interface portion 746 may be connected to support halo 750 using any fastening means known in the art, including but not limited to screws, nuts and bolts, snap fit fasteners, and press fit fasteners. Vertical members 710 may be made of any suitable material known in the art including, but not limited to, metals or polymers. Any locking mechanism 718 known in the art, including, but not limited to, a lock pin, a ball pin, and nut and bolt fasteners may be used. In an alternative embodiment, two or more locking mechanisms 718 may be inserted through two or more aligned through bores 715, 745.

Referring now to FIGS. 17a, 17b, 19, and 20, ring interface portions 746 (and entire adjustable height beam 740) are connected to and disposed about support halo 750 at angle A740, the angle A740 defined by the planes that vertically bisect the inside face 710a of each vertical member 710, that is preferable 135.0 degrees. In other embodiments, this angle A740 may be 180.0 degrees or smaller, depending on the number of platform sections 410 used, for example. The overall height H750 (as measured vertically between the vertical tubular bottom face 710f and top surface support ring top surface 750a) of the support ring 750 can be adjusted as previously described to accommodate the different heights of the user. The range in support ring height H491 is preferably between 30.0 and 50.0 inches. In this embodiment, support halo 750 is a closed loop structure designed to extend completely around the user. To accommodate the user, support halo 70 preferably has a minimum inner width W750 between 15 and 25 inches. Although halo 750 is a closed structure that extends completely around the user in this embodiment, in other embodiments, the support halo (e.g., support halo 750) can be an open structure that extends partially around the user (e.g., C-shaped).

Referring now to FIGS. 17a, 17b, 20, and 21, support halo 750 extends about a vertical central axis 705 and has a top surface 750a opposite a bottom surface 750b, and inner surface 750c opposite an outer surface 750d. In this embodiment, support halo 750 is an annular ring, and thus, may also be referred to as support ring 750. It should be appreciated that since support ring 750 is annular in this embodiment, minimum inner width W750 is an inner diameter D750. Although support halo 750 is annular in this embodiment, in other embodiments, the support halo (e.g., support halo 750) can have other geometries such as oval, ovoid, rectangular, square, etc.

Support ring 750 further comprises a support structure 753, a lower ring 755, an upper ring 757, and a door 759 with a latch 760 and a hinge 765. In the present embodiment, support structure 753 provides rigidity as well as a structure on which to attach the lower and upper rings 755, 757, respectively. When door 759 is closed, support structure 753 overlaps the support structure 753 in the support ring 750, allowing the support ring 750 to support a load. Support structure 753 may be made of any suitable material known in the art including, but not limited to, metals or polymers, and is preferably made of high-density polyethylene (HDPE). Lower ring 755 has a U-shaped cross section and is attached to support structure 753 to form the bottom surface 750b and the lower part of both inner and outer surfaces 750c, 750d, respectively. Upper ring 757 has an inverted U-shaped cross section and is attached to support structure 753 to form the top surface 750a and the upper part of both inner and outer surfaces 750c, 750d, respectively. Lower and upper rings 755, 757, respectively, also comprise cutouts 756 to accommodate any suitable fastening device known in the art including, but not limited to screws, snap fit fasteners, and press fit fasteners. Lower and upper rings 755, 757, respectively, may be made of any suitable material known in the art, including but not limited to polymers.

Door 759 comprises a portion of support ring 750 that is movable by horizontally pivoting at hinge 765 along an axis parallel to central axis 405. Hinge 765 in combination with a pin 766 may employ any suitable means known in the art, including but not limited to a ball pin, a lock pin, and a quick release pin. When in the closed position, latch 760 engages a lock plate 761 disposed on the stationary portion of support ring 750.

Figure 22:
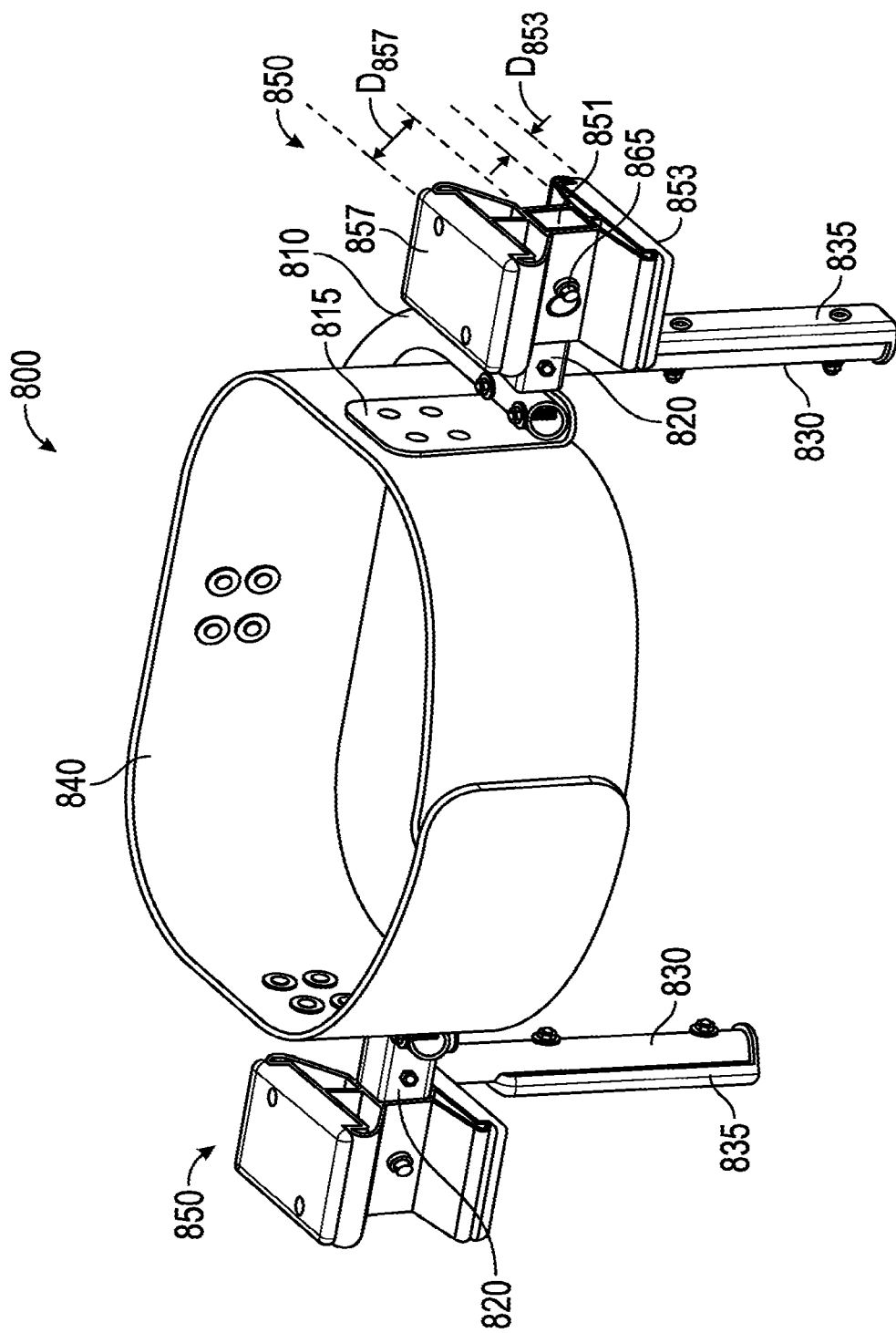
FIG. 22 is a perspective view of the safety harness of the locomotion system of FIG. 31.

Referring now to FIGS. 10 and 22, safety harness 800 comprises a generally U-shaped bar 810, a pair of mounting members 820, a pair of vertical members 830, a waist belt 840, and two interface structures 850. U-shaped bar 810 is tubular and lies in a plane orthogonal to central axis 405. At each end of U-shaped bar 810, a mounting member 820 extends radially outward from U-shaped bar 810; and a vertical member 830 extends axially downward from the mounting member 820. In the present embodiment, mounting member 820 is a square tubular bar and vertical member 830 is a vertical tubular bar that further comprises a vertical contact structure 835. Mounting member 820 and vertical member 830 may be made of any suitable material known in the art, including but not limited to metals and polymers. In the present embodiment, vertical contact structure or glide pad 835 is fastened to an exterior side of vertical member 830 with nuts and bolts. Vertical contact structure 835 may be made of any suitable material known in the art, including but not limited to polymers, and is preferably made of HDPE. A waist belt 840 is fixably attached to the U-shaped bar 810 on each of the interior sides of the U-shaped cross section. Waist belt 840 may be attached to bar 810 using any means standard in the art including, but not limited to, hook and loop fasteners, buttons, nuts and bolts, screws, and adhesives. Waist belt 840 may be attached directly to bar 810 or may be attached to a bracket 815 (FIG. 22) that is then attached to the bar 810.

Referring now to FIG. 22, an interface structure 850 is disposed on each mounting member 820. Each interface structure 850 has a tubular bore 851 disposed in the center portion of interface structure 850 that slidingly engages mounting member 820. Interface structure 850 comprises a low horizontal contact structure or glide pad 853 and a high horizontal contact structure or glide pad 857 that are installed opposite each other; thus, when high horizontal contact structure 857 is facing upward, low horizontal contact structure 853 is facing downward toward platform 400 and vice versa. The distance $D_{857}$ from the center of tubular bore 851 vertically upward to high horizontal contact structure 857 is greater than the distance $D_{853}$ from the center of tubular bore 851 vertically downward to low horizontal contact structure 853. The difference in distance $D_{853}$, $D_{857}$ allows for an additional level of height adjustment when the interface structure 850 is reversed. In the present embodiment, horizontal glide pads 853, 857 are fastened to opposite exterior sides of interface structures 850 with nuts and bolts. Interface structure 850 has a length $L_{850}$ preferably between 4.0 and 10.0 inches and a height ($D^{853}$ plus $D^{857}$) preferably between 2.0 and 8.0 inches. Horizontal glide pads 853, 857 may be made of any suitable material known in the art, including but not limited to polymers, and is preferably made of HDPE. Interface structure 850 is secured to mounting member 820 with a locking mechanism 865. Locking mechanism 865 may be any fastener known in the art, including, but not limited to, a lock pin, a ball pin, and nut and bolt fasteners may be used.

During use, harness 800 is placed in support ring 750 such that interface structures 850 slidingly engage the support ring 750 and can move circumferentially and radially relative to the support ring 750. Further, horizontal glide pads 853, 857 (either low or high, respectively) rest on and are in contact with top surface 750a and vertical contact structure 835 is disposed within inside surface 750c of support ring 750 allow ease in maneuverability of the user. The user may move up and down above the support ring 750 such that the interface structures 850 no longer engage the support ring 750 and the vertical contact structure 835 may or may not remain disposed within the inside surface 750c of support ring 750. As previously described, support ring 750 and contact structures are all made of polymers, which allows the contact structures 835, 853, 857 to slide on support ring 750.

Figure 23:
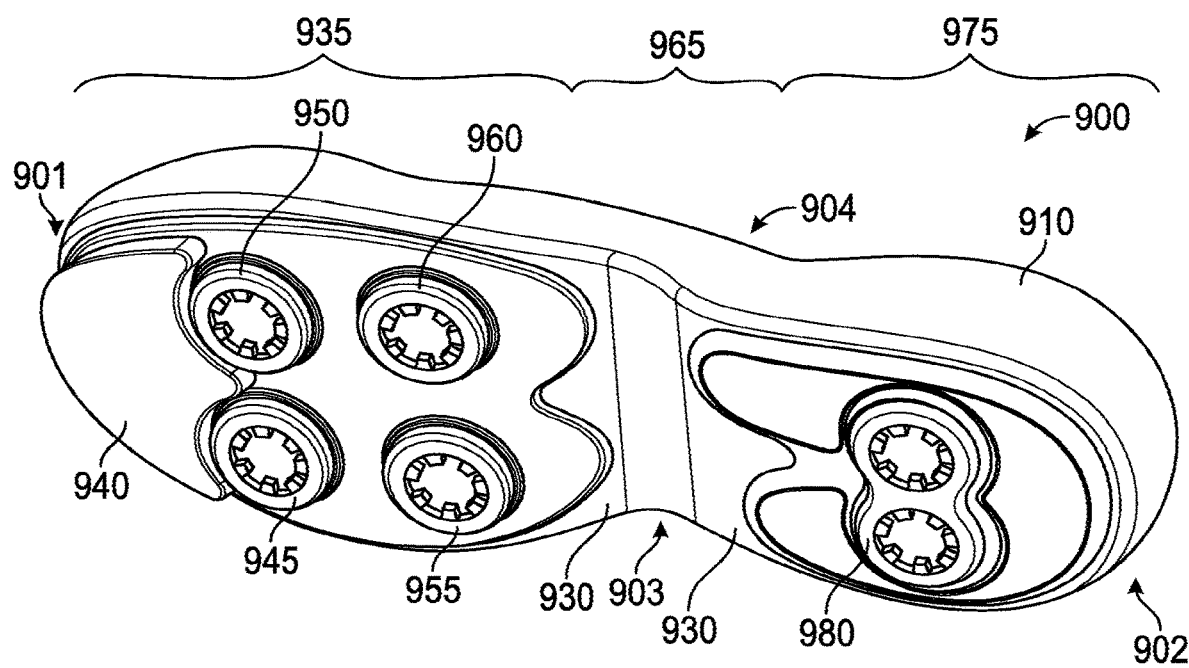
FIG. 23 is a perspective view of an embodiment of a foot covering in accordance with the principles described herein for use with embodiments of locomotion platforms described herein.

Referring now to FIG. 23, an embodiment of a foot covering 900 for use with embodiments of locomotion systems and platforms described herein is shown. In this embodiment, foot covering 900 comprises an upper portion 910, a sole 930, and a plurality of variable friction pads 940-960, 980. As used herein, the term "foot covering" refers to a shoe or an overshoe. An overshoe is a foot covering that at least partially covers the wearer's shoe and generally includes a sole and a means to attach the sole to the wearer's shoe or body (e.g., foot, ankle, or leg). Further, when used to describe foot covering 900, the terms "top" or "bottom" may be used for purposes of description with "up," "upper," "upward," or "above" meaning generally toward or closer to the end of foot covering 900 closest to the toe 901, and with "down," "lower," "downward," or "below" meaning generally toward or closer to the end of foot covering 900 closest to the heel 902. The overall length and width of foot covering 900 will vary depending on the size of the wearer's foot; thus, foot covering 900 may be customized to fit any sized foot. In the present embodiment, foot covering 900 may be made of any suitable material known in the art, including but not limited to fabric, leather, or other suitable material known in the art.

Referring still to FIG. 23, sole 930 of foot covering 900 covers the underside of the wearer's foot and connects to upper portion 910 along the entire perimeter of the wearer's foot. In this embodiment, upper portion 910 and sole comprise one continuous piece of material.

Sole 930 comprises three sections—a forefoot 935, a midfoot 965, and a hindfoot 975. Forefoot section 935 includes toe friction pad 940 and a first, second, third, and fourth forefoot pad 945, 950, 955, 960, respectively. Toe friction pad 940 is disposed on the bottom of sole 930 proximal to the toe 901 or the "top" of sole 930, and has two curved or cut out portions at the lower end of friction pad 940. Toe friction pad 940 extends from the top of toe 901 downward toward heel 902 preferably between 0.5 and 2.5 inches and from one side 903 across the entire width of sole 930 to the other side 904. Friction pad 940 may be round or any other suitable shape known in the art. Friction pad 940 may be made of any suitable material including, but not limited to, fabric, leather, or polymers. First friction pad 945 is generally circular and is disposed below and adjacent to toe friction pad 940 in one of the cut out portions at the bottom of toe friction pad 940. First friction pad 945 has a diameter preferably between 0.4 and 2.0 inches. Second friction pad 950 is generally circular and is disposed below and adjacent to toe friction pad 940 in the other of the two cut out portions at the bottom of toe friction pad 940. Second friction pad 950 has a diameter preferably between 0.4 and 2.0 inches. Third friction pad 955 is generally circular and is disposed on sole 930 below and proximal to first friction pad 945. Third friction pad 955 has a diameter preferably between 0.4 and 2.0 inches. Fourth friction pad 960 is generally circular and is disposed on sole 930 below and proximal to second friction pad 950. Fourth friction pad 960 has a diameter preferably between 0.4 and 2.0 inches. Though shown in the present embodiment with four friction pads 945, 950, 955, 960, in other embodiments, forefoot section 935 may comprise three or fewer friction pads of varying sizes. In yet other embodiments, forefoot section 935 may comprise five or more friction pads of varying sizes.

Still referring to FIG. 23, midfoot section 965 comprises the portion of the shoe covering 900 that supports the arch of the wearer's foot. In this embodiment, midfoot section 965 does not comprise any friction pads. However, in other embodiments, midfoot section 965 may comprise one or more friction pads of varying sizes.

Hindfoot section 975 comprises heel friction pad 980. Fifth friction pad 980 is generally shaped like a FIG. 8 on its side, and is disposed on sole 930 approximately centered between sides 903, 904 and proximal to the heel 902. Fifth friction pad 980 has a width preferably between 0.4 and 2.0 inches and a height preferably between 0.4 and 2.0 inches. Though shown in the present embodiment with one friction pad 980 in other embodiments, hindfoot section 975 may comprise two or more friction pads of varying sizes and shapes.

All friction pads 940, 945, 950, 955, 960, 980 have a thickness preferably between 0.1 and 1.0 inch. Though the majority of friction pads 940-960, 980 are shown in the present embodiment as circular, in other embodiments friction pads 940-960, 980 may extend from one side 903 across the entire width of sole 930 to the other side 304. Friction pads 940-960, 980 may be made of any suitable material known in the art including, but not limited to, polymers, ceramics, rubber, fabric, fiber glass, or fur. Friction pads 940-960, 980 are preferably made of polyethylene or polytetrafluoroethylene, and more preferably made of high density polyethylene. In another embodiment, sole 930 may comprise a layer of fur instead of friction pads. In another embodiment, the entire foot covering 900 may comprise fur or fabric. In another embodiment, the foot coverings 900 may comprise a plastic low friction bag that wraps around the shoe of the user.

Because upper platform surface 460 is inclined, the friction pads 940-960, 980 will slide downward toward the center zone 470 under the force of gravity. The ease or amount of sliding of the pads 940-960, 980 on platform surface 460 will depend on the coefficient of friction between the pads 940-960, 980 and surface 460. The coefficient of friction may vary depending on the material chosen for both the platform surface 460 and the pads 940-960, 980. Thus, the material for friction pads may be selected based upon the desired coefficient of friction.

Friction pads 940-960, 980 are preferably made of a material having a coefficient of dry friction with platform surface 460 less than or equal 0.40 or a coefficient of lubricated friction with platform surface 460 less than or equal to 0.25. Moreover, each friction pad 940-960, 980 may, but need not have different coefficients of friction. Different coefficients of friction may be attained for different portions of the overshoe sole 930 by changing the materials of each friction pad 940-960, 980. Thus, the coefficient of friction of the individual friction pads 940-960, 980 may vary between each friction pad allowing the toe friction pad 940, for example, to have a greater coefficient of friction than the interior first, second, third, fourth, and fifth friction pads 945-960, 980. Increasing the coefficient of friction between the toe friction pad 940 and the platform surface 460, allows for greater stability by reducing the sliding effect when the heel lifts off the platform surface 460.

The use of a lubricant can further decrease the coefficient of friction between the pads 940-960, 980 and platform surface 460. Lubricants standard in the art may be used, including but not limited to silicone wipes or oil-based sprays.

To utilize the locomotion system 40, the user dons the foot coverings 900 on both feet, steps onto the platform 400 and to the center zone 470, and into support ring 750. The user then straps on the support harness 800 and then closes and latches the door 759. The user can then employ the virtual reality device of his/her choice. Once in the virtual environment, any movement in the physical world made by the user will translate to movement in the virtual world.

The user may exercise freedom of movement while on platform 400. The user may take a first step with a first leg off the center zone 470 and onto the angled top surface 460. As the user takes a second step with his/her second leg, the force of gravity guides the user's first foot down the incline of angled top surface 460 toward center zone 470. The low coefficient of friction between the foot covering pads 940-960, 980 and the platform surface 460 allows the foot covering 900 to slide on surface 460, and the process is repeated. The user is thus able to maintain continuous walking motion in the virtual world while only moving within the perimeter of platform 400.

As previously described, angled top surface 460 need not comprise any channels or grooves and still allow the user to exercise freedom of movement while on the platform 400. However, in the preferred embodiment, angled top surface 460 does include grooves 480 as the grooves decrease the contact surface area between the platform 400 and the foot coverings 900, guide the user's foot to the center zone 470, prevent lateral slide, and are aesthetically pleasing.

Figure 24:
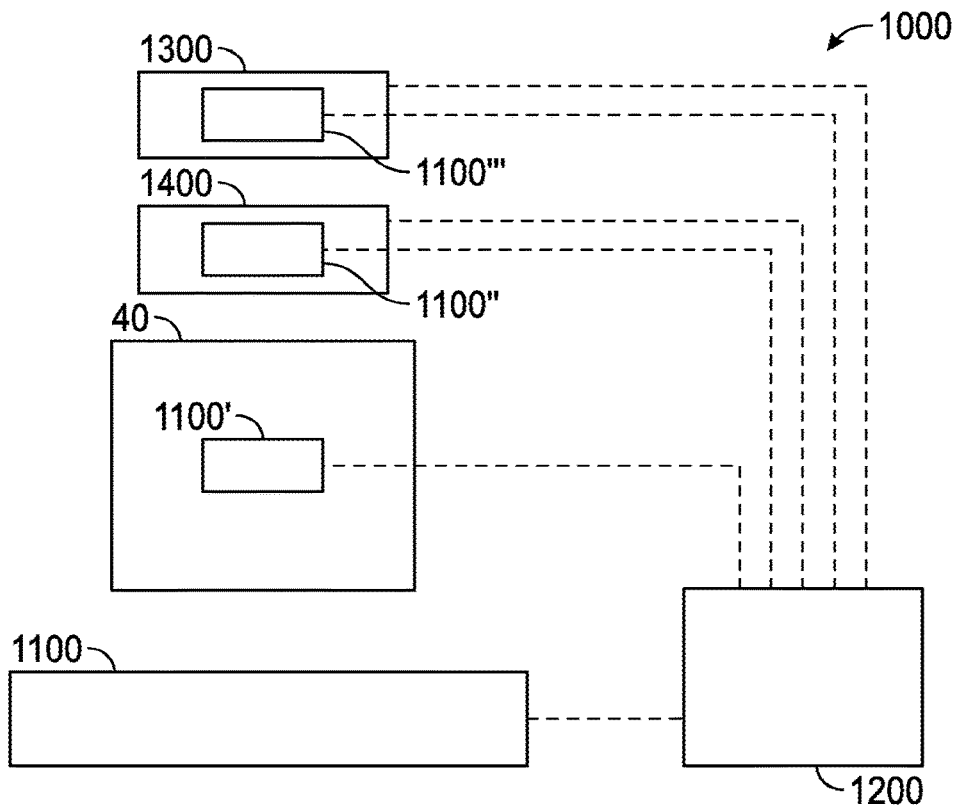
FIG. 24 is a schematic view of a virtual reality system for use with the locomotion system of FIG. 31.

Referring now to FIG. 24, the locomotion system 40 described herein may be used in conjunction with a virtual reality system 1000, which may comprise a processing unit 1200 in communication with one or more motion sensing devices 1100, a display device 1300, and a controller 1400. The virtual reality system components may be separate devices or combined into one or more devices. Motion sensing devices 1100 detect, register, and track the user's motions and gestures and may be separate from the platform 400 of locomotion system 40 (shown as component 1100 in FIG. 24), may be integrated into the platform 400 of system 40 (shown as component 1100' in FIG. 24), may be integrated into the controller 1400 (shown as component 100" in FIG. 24), may be integrated into the display device 1300 (shown as component 1100' in FIG. 24), or any combination thereof, such that virtual reality system 1000 comprises motion sensing devices as a separate component 1100, in the locomotion platform 400 of system 40 (component 1100'), in the controller 1400 (component 1100"), and/or in the display device (component 1100'). In general, any motion sensing device known in the art may be used including, without limitation, optical gesture recognition devices or devices employing inertial motion sensors, accelerometers, magnetometers, infrared or optical tracking, capacitive sensors built in the base of platform 400, global positioning tracking, magnetic tracking, or any combination thereof, including but not limited to a Microsoft® Kinect™, Asus® Wavi Xtion™; Razer® Hydra, Sixense STEM, LEAP MOTION, MYO, INTEL PERCEPTUAL COMPUTING, Sony® PlayStation® Move, and Nintendo® Wii® Remote and Wii® Nunchuck.

The processing unit 1200 utilizes motion recognition software to process the input signals from the motion sensing devices 1100 and controller 1400, recognize the user's motions and gestures on platform 400 of locomotion system 40, and send output signals to a virtual environment program and to the display device 1300. The virtual environment program comprises a game or any other three-dimensional environment software that is compatible with the processing unit 1200 and display device 1300. The output signals the processing unit 1200 sends to the virtual environment program and the display device 1300 direct the movements and actions of the virtual representation of the user (i.e., the avatar) based on the physical motions of the user, and correspondingly change the projected view to the user, respectively. In general, any processing unit known in the art may be used including, without limitation, a personal computer, laptop, game console, smartphone, or tablet that is capable of processing graphics and running software capable of processing input from the motion sensing devices and sending output signals to the virtual environment program and display device. In an alternative embodiment, processing unit 1200 is an integral component of locomotion system 40.

The display device 1300 provides the visual images of the virtual environment to the user. In general, any display device known in the art may be used including, without limitation, virtual reality glasses including but not limited to Oculus Rift, Vuzix® Wrap 920 VR Bundle; or projectors, screens, and CAVE environments that may or may not be integrated with the processing unit.

The virtual reality system 1000 may further comprise a wired or wireless controller 1400 to further aid in directing certain avatar actions in the virtual environment, such as a game pad or joystick (e.g., Xbox 360® controller, if compatible or made compatible with the processing unit 1200 and virtual environment program), a keyboard and mouse, a TacticalHaptics controller, a Sixense STEM controller, or a gun (such as the Wii Zapper® with the Wii Remote® and Wii Nunchuk®, if compatible or made compatible with the processing unit 1200 and virtual environment program) or other weapon peripheral. As previously discussed, in other embodiments, the controller 1400 may also comprise motion sensing devices 1100.

It should be appreciated that the user may perform any number of movements while using locomotion system 10, 40 including but not limited to crouching, jumping, squatting, walking, running, kneeling, standing, turning, and strafing (i.e., sideways stepping). Thus, the user can move about the virtual environment by moving unhindered in the physical world and having those movements translated to motion in the virtual environment.

Figure 25:
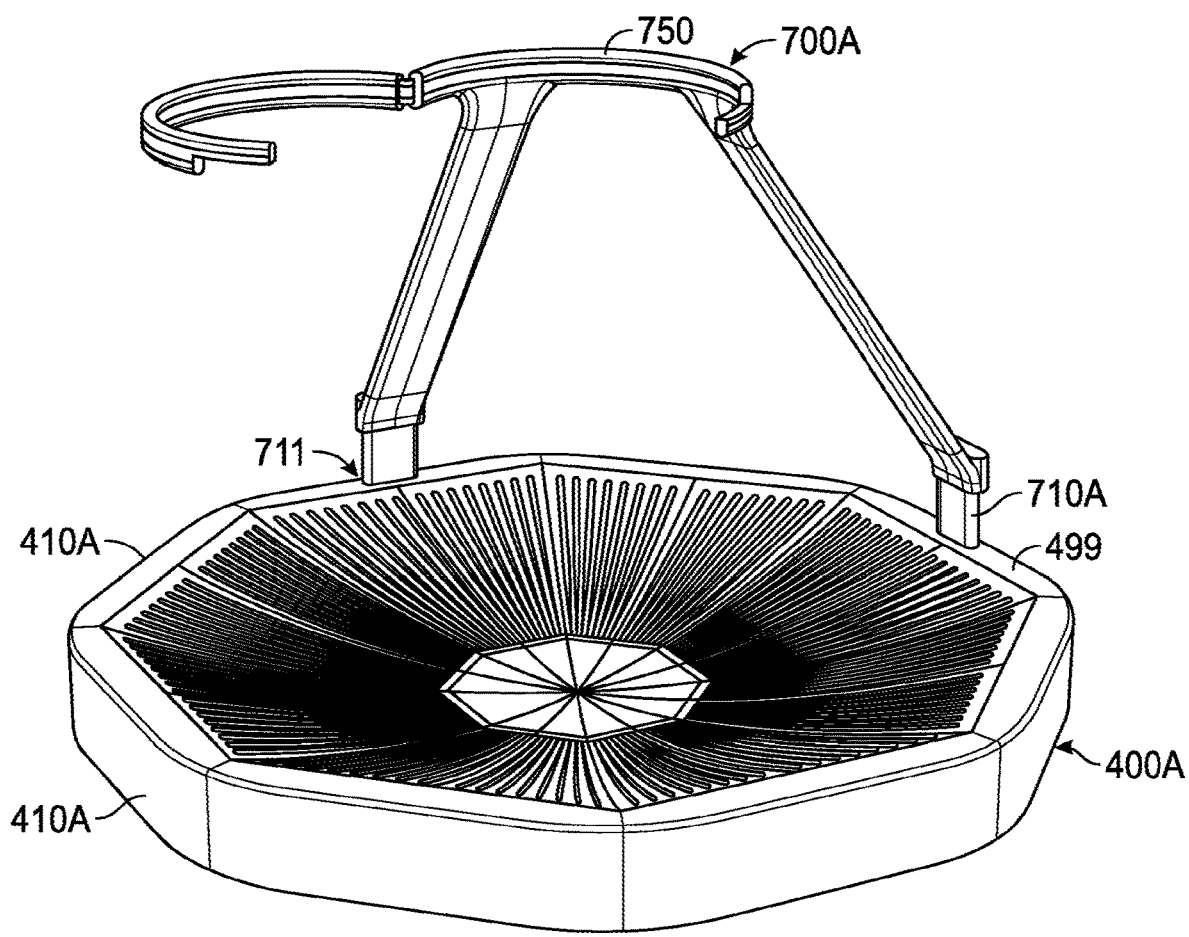
FIG. 25 is a schematic view of an embodiment of a safety harness support structure and locomotion system in accordance with the principles described herein.

As previously described, the safety harness support structure 700 comprises vertical members 710 coupled to base 600 (via coupling to tubular members 610) and extending from the planar back face 430 of the platform 400. However, in other embodiments, the safety harness support structure 700A could alternatively be coupled to the platform 400A by other means, for example as shown in FIG. 25, vertical members 710A are seated in mating receptacles 711 in radial outer portion 499 of section 410A.

Figure 26:
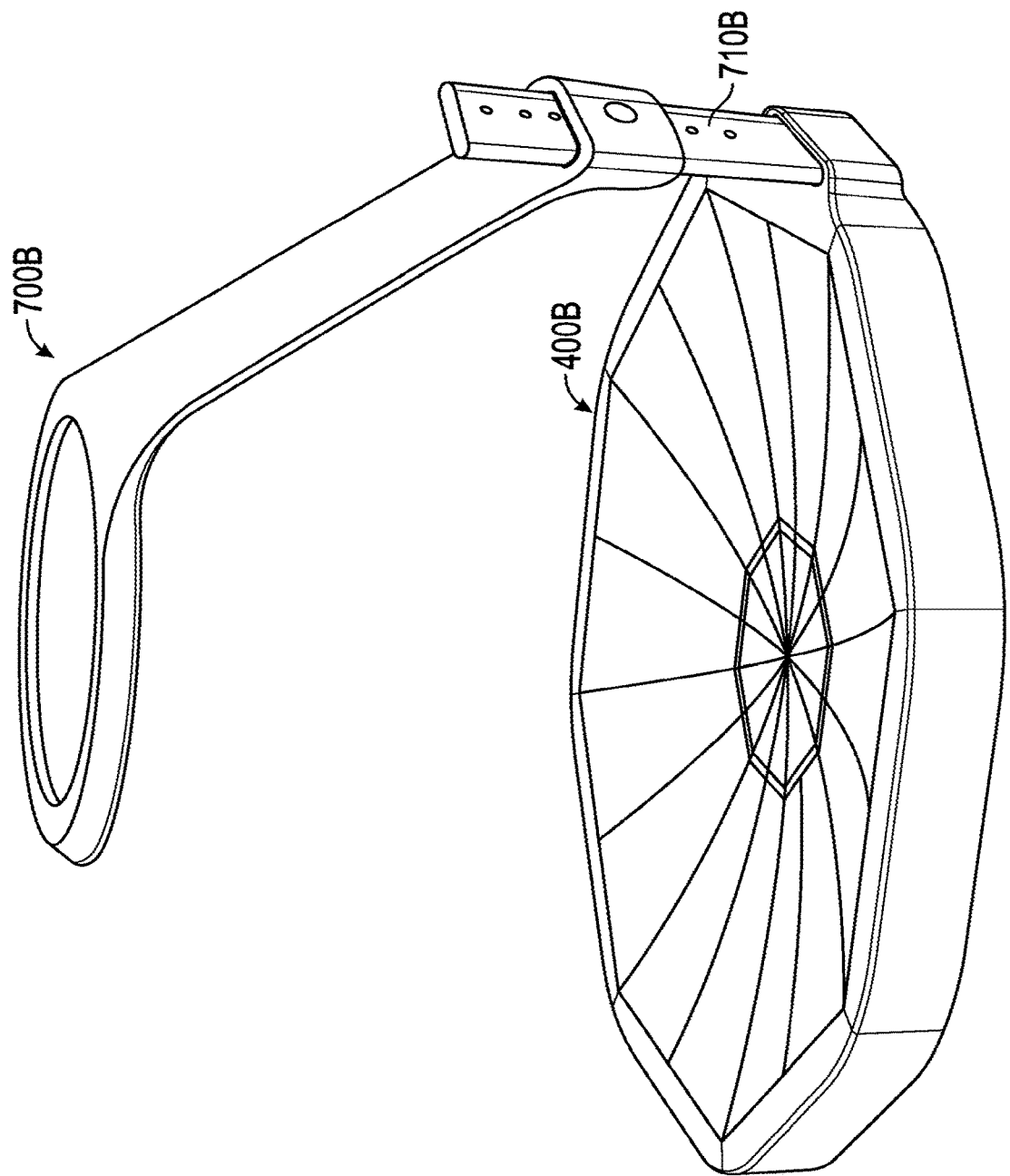
FIG. 26 is a schematic view of an embodiment of a safety harness support structure and locomotion system in accordance with the principles described herein.

As previously described, the safety harness support structure 700 comprises two vertical members 710 coupled to the platform 400 (via tubular members 610 of base 600). However, in other embodiments, the safety harness support structure 700B could alternatively be coupled to the platform 400B by only one vertical member 710B, as shown in FIG. 26.

Figure 27:
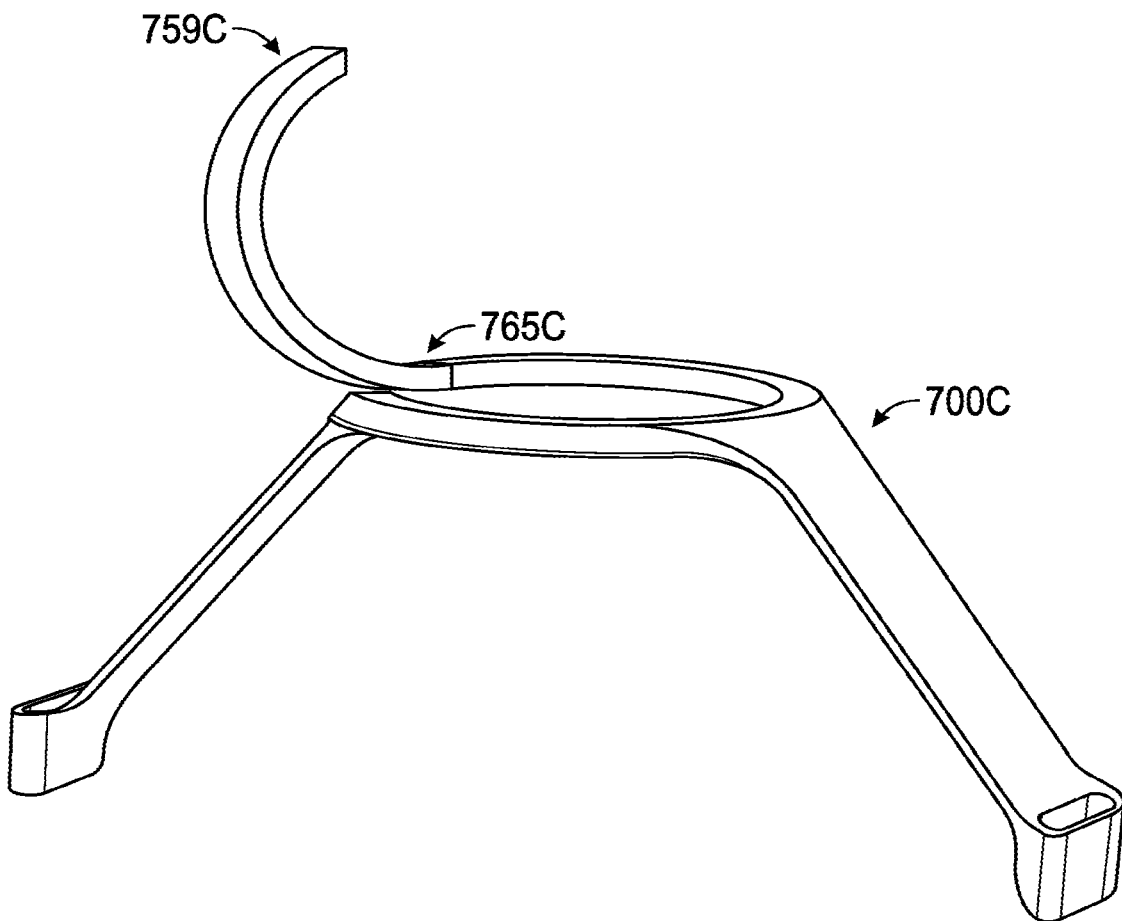
FIG. 27 is a schematic view of an embodiment of a safety harness support structure in accordance with the principles described herein for use with locomotion systems described herein.

As previously described, the door 759 comprises a portion of support ring 750 that is movable by horizontally pivoting at hinge 765 along an axis parallel to central axis 405. However, in other embodiments, the door 759C could alternatively be movable at hinge 765C by pivoting outward horizontally, vertically, or a combination of both. For example, as shown in FIG. 27, door 759C could be moveable by vertically pivoting at hinge 765C.

As previously described, to prevent the user from falling, the user wears a waist or support belt 840 that can be tightened around the user's waist. This waist belt 840 can comprise of additional straps that go around the user's legs, hence forming a harness. The belt 840 and the additional straps can be made of leather, fabric, or any other material, and can be tightened and closed by means of hook- and loop-fasteners or any other belt tightening and closing mechanism.

Figure 28:
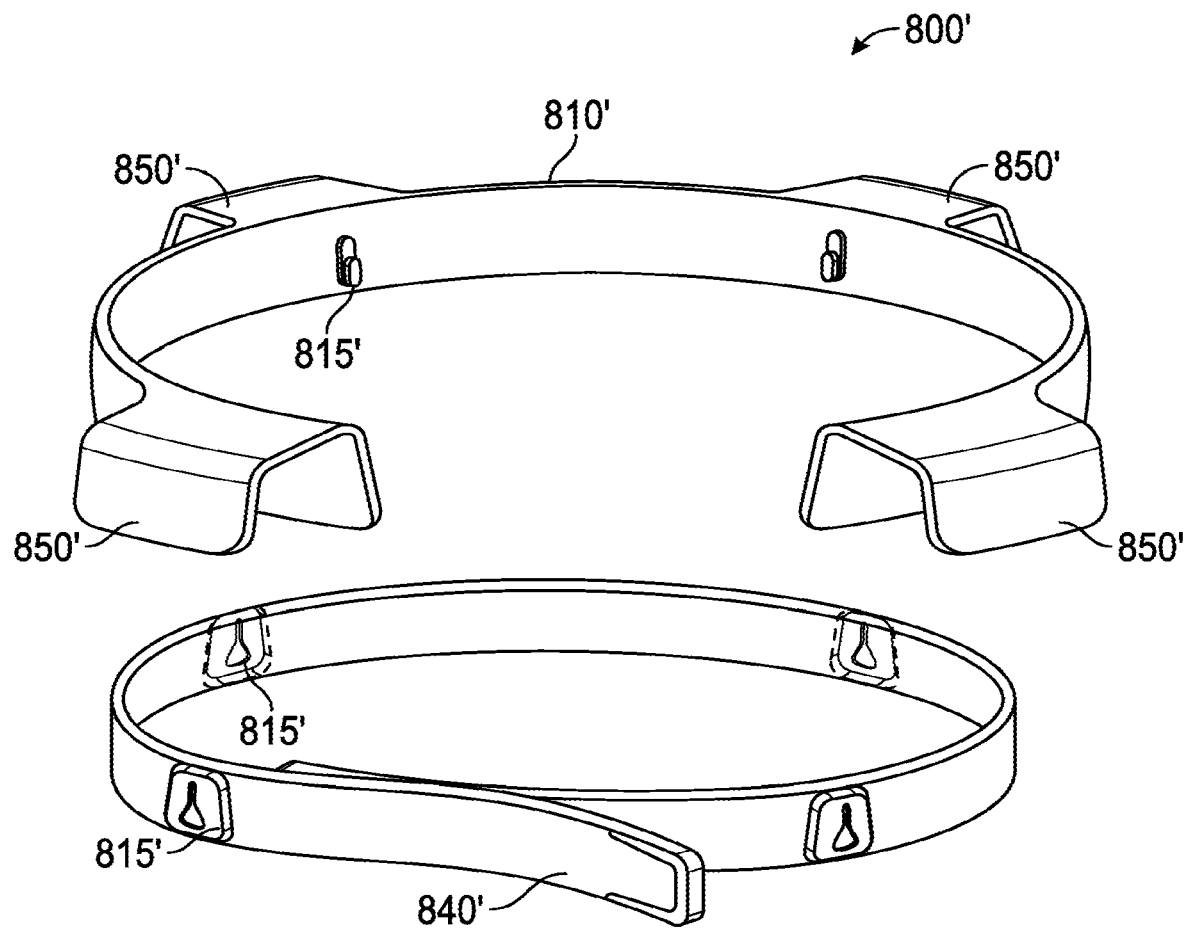
FIG. 28 is a schematic view of an embodiment of a safety harness in accordance with the principles described herein for use with locomotion systems described herein.
Figure 29A:
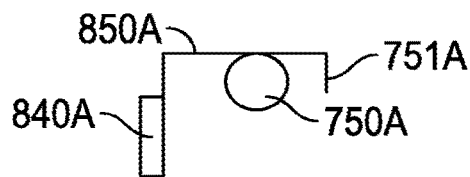
FIGS. 29a-29q are schematic cross-sectional views of different embodiments of safety harnesses and a support ring in accordance with the principles described herein for use with locomotion systems described herein.
Figure 29F:
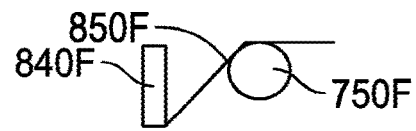
Figure 29B:
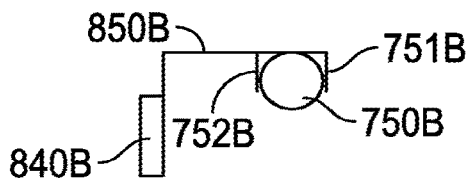
Figure 29G:
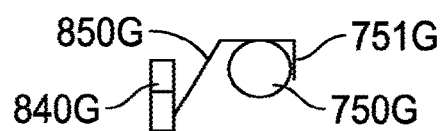
Figure 29C:
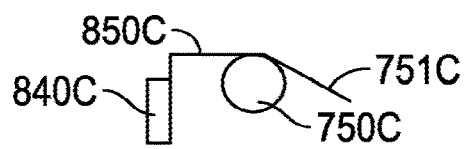
Figure 29H:
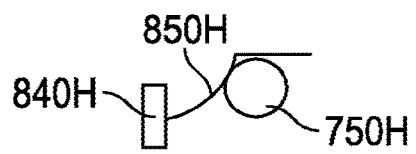
Figure 29D:
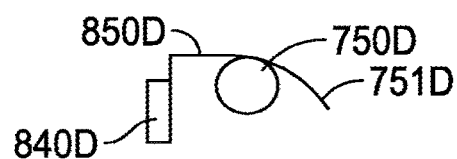
Figure 29I:
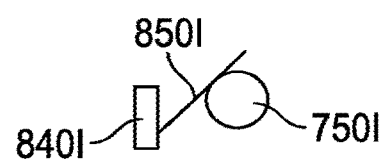
Figure 29E:
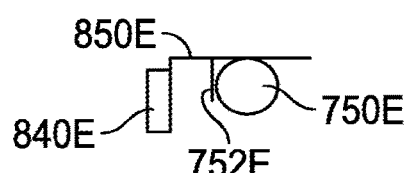
Figure 29J:
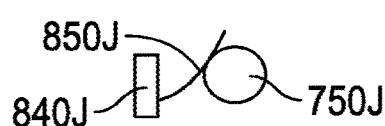
Figure 29K:
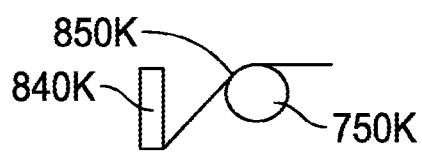
Figure 29P:
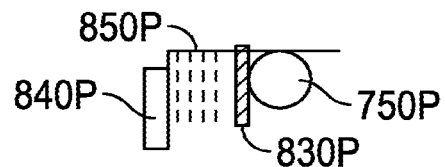
Figure 29L:
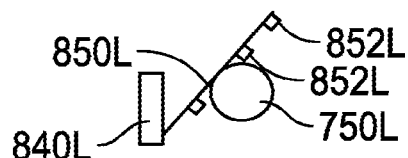
Figure 29Q:
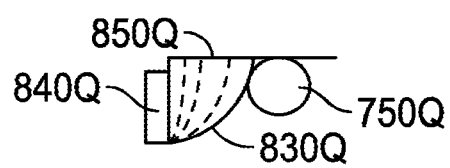
Figure 30:
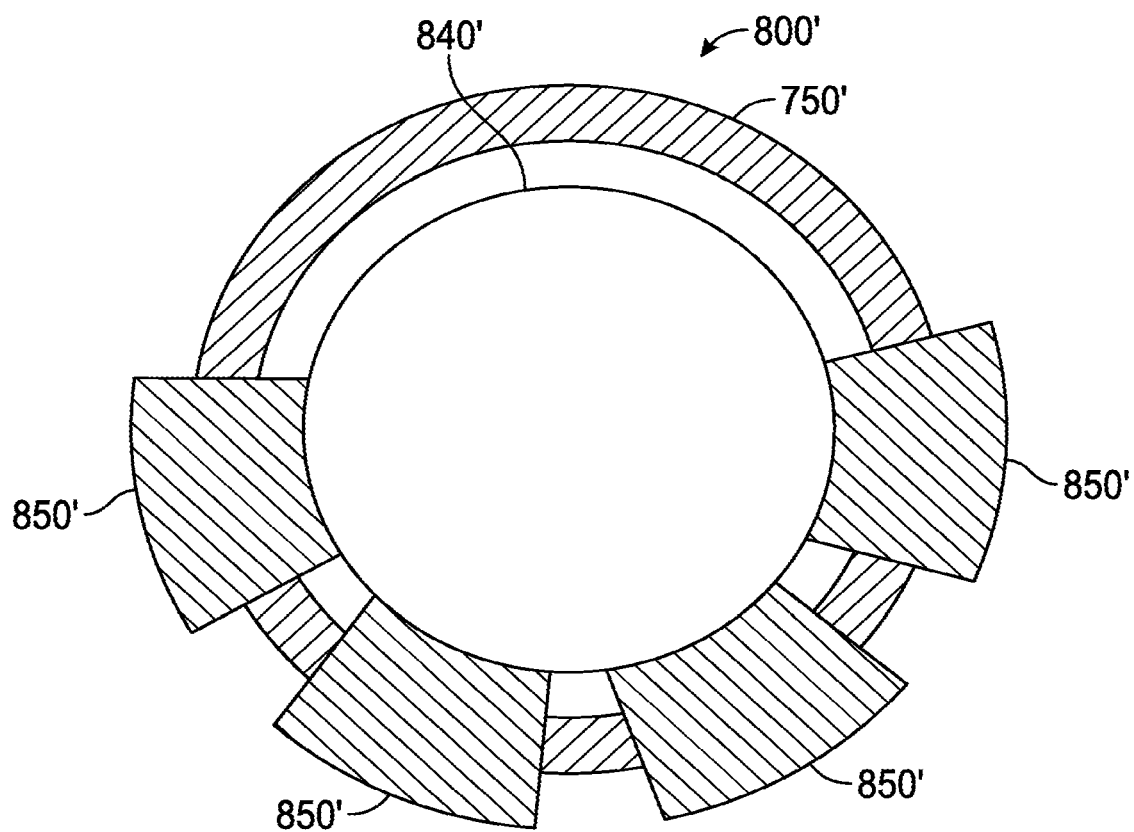
FIG. 30 is a schematic top view of an embodiment of a safety harness in accordance with the principles described herein for use with locomotion systems described herein.

As previously described, waist belt 840 is fixably attached to the U-shaped bar 810 on each of the interior sides of the U-shaped cross section by any fastener 215 standard in the art. However, in other embodiments, waist belt 840 may be coupled directly to interface structures or flanges 850 via fasteners 815', as shown in FIGS. 28 and 29*a*-29*q*. In addition, safety harness 800' may comprise three or more flanges 850' attached to bar 810'. For example and as is shown in FIGS. 28 and 30, safety harness 800' may comprise four flanges 850'. Further, flanges 850 may be configured differently, as shown in FIGS. 28 and 29*a*-29*q*. As previously described, interface structures or flanges 850 comprise horizontal glide pads 853, 857 that slide on support ring 750.

Referring now to FIGS. 29*a*-29*q*, the position of the flanges 850A-850Q is such that they are above the support ring 750A-750Q, and the flanges 850A-850Q are long enough to extend over the support ring 750A-750Q when the user stands in the middle of the platform 400. The flanges 850A-850Q can thus never drop below the support ring 750A-750Q. As such, because the flanges 850A-850Q are attached to the user's waist belt 840A-840Q, the user will be blocked from falling down by the flanges 850A-850Q, as the flanges themselves are blocked from going down by the support ring 750A-750Q.

The flanges 850A-850Q can be made of metal, plastic, wood, or any other material with sufficient structural strength. They can be a solid flat surface, or round tubes, or any other shape or form that provides the desired support. The flanges 850A-850Q can be attached to the belt by rivets or any other attachment mechanism that is strong enough to keep the flanges in a straight horizontal position whenever an upward force is applied to them. The user's waist belt 840A-840Q can be enforced with an additional bendable ring to provide enough structural strength to keep the flanges in place and in horizontal position.

The flange of FIG. 29*a* has a hook shape 751A, which extends vertically downward from the end flange 850A on the outside of support ring 750A. Like numbers are used to designate like parts. The flange 850B of FIG. 29*b* has an additional secondary hook 752B disposed on the inside of support ring 750B. The flange 850C of FIG. 29*c* has a downward sloping edge 751C on the outside of support ring 750C. The flange 850D of FIG. 29*d* has a curved edge 751D on the outside of support ring 750D. The flange 850E of FIG. 29*e* has only an interior hook 752E disposed on the inside of support ring 750E. Those hook flanges can further be attached to the belt via hinges, providing some more movement flexibility to these hooks.

Similarly, one or more flanges can be upward sloping or curved within the support ring. For example, the flange 850F of FIG. 29*f* slopes upward on the inside of support ring 750F and then extends horizontally past support ring 750F. The flange 850G of FIG. 29*g* has a hook 751G disposed on the outside of support ring 750G. The flange 850H of FIG. 29*h* is curved upward on the inside of support ring 750H and then extends horizontally past support ring 750H. The flange 850I of FIG. 29*i* slopes upward on the inside of and extends past support ring 750I. The flange 850J of FIG. 29*j* curves upward on the inside of support ring 750J.

Figure 29M:
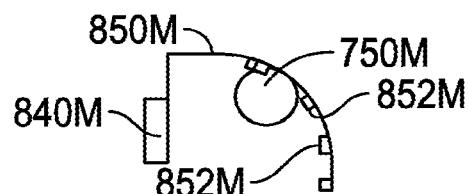
Figure 29N:
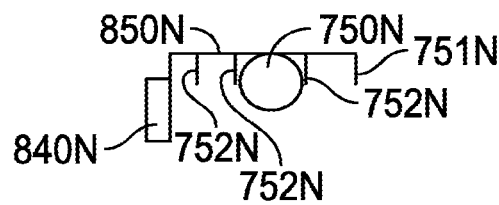
Figure 29O:
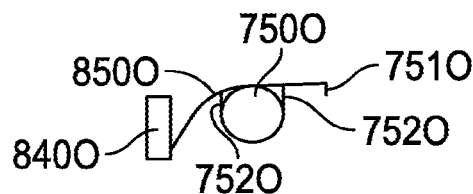

To allow for different waist sizes and user adjustability, the flanges can have different edges that can fit over the ring. For example, the flange 850K of FIG. 29*k* curves in a convex manner over support ring 750K. The flange 850L of FIG. 29*l* slopes upward on the inside of and extends past support ring 750L, and further comprises tabs 852L that extend vertically downward from flange 850L to catch support ring 750L. The flange 850M of FIG. 29*m* curves in a convex manner over and extends past support ring 750M, and further comprises tabs 852M that extend toward support ring 750M from flange 850M to catch support ring 750M. The flange 850N of FIG. 29*n* comprises a hook shape 751N, which extends vertically downward from the end flange 850N, and a plurality of additional hook shapes 752N to allow a plurality of positions for hook shapes 752N to rest around support ring 750N. The flange 850O of FIG. 29*o* is substantially similar to the flange of FIG. 29*n*, but with flange curving upward and having hook shapes 751O, 752O.

Also, the user can adjust the level of radial constraint by adjusting the position of the vertical member 830. For example, as shown in alternative embodiment in FIG. 29*p*, moving the pin 830P further out results in more constraint, closer to the user results in less constraint. The vertical members 830P can be replaced by curved or upward sloping "bumpers" 752Q, as shown in FIG. 29*q*, that are attached to the belt 840Q, providing a closed loop. As with the vertical members 830P, the user can adjust the top position of the bumper 830Q, to adjust the level of constraint.

Figure 31:
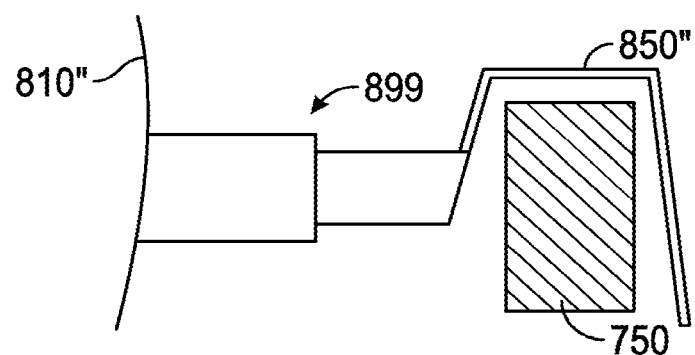
FIG. 31 is a schematic cross-sectional side view of an embodiment of a safety harness and a support ring in accordance with the principles described herein for use with locomotion systems described herein.

Any combination of the above is possible to provide the user with a radial movement constraint while allowing rotation, and while allowing for different user waist sizes and different levels of radial constraint. As previously described, the safety belt 840 is fixably attached to bar 810 and may be adjustable. In one embodiment, shown in FIG. 31, bar 810" is adjustable via an extendable connector 899, which connects to flange or interface structure 850". Extendable connector 899 allows for some forward and backward flexibility of the user.

While preferred embodiments have been shown and described, modifications thereof can be made by one skilled in the art without departing from the scope or teachings herein. The embodiments described herein are exemplary only and are not limiting. Many variations and modifications of the systems, apparatus, and processes described herein are possible and are within the scope of the invention. For example, the relative dimensions of various parts, the materials from which the various parts are made, and other parameters can be varied. Accordingly, the scope of protection is not limited to the embodiments described herein, but is only limited by the claims that follow, the scope of which shall include all equivalents of the subject matter of the claims. Unless expressly stated otherwise, the steps in a method claim may be performed in any order. The recitation of identifiers such as (a), (b), (c) or (1), (2), (3) before steps in a method claim are not intended to and do not specify a particular order to the steps, but rather are used to simplify subsequent reference to such steps.

What is claimed is:

1. A locomotion system comprising:
   a low friction platform configured to be used with low friction footwear;
   at least one harness support assembly engaged with the platform and extending upward from the platform;
   a safety harness engaged with the harness support assembly,
   wherein the at least one harness support assembly and the safety harness:
      provide horizontal support to a user on the platform, and
      enable vertical movement and rotational movement of the user on the platform.

2. The system of claim 1, wherein the at least one harness support assembly and the safety harness provide vertical support to the user on the platform.

3. The system of claim 1, wherein the low friction footwear includes one or more attached motion sensing devices.

4. The system of claim 1, further comprising one or more motion sensing devices.

5. The system of claim 4, wherein the one or more motion sensing devices are inertial sensors.

6. The system of claim 4, wherein the one or more motion sensing devices are optical sensors.

7. The system of claim 1, further comprising a controller.

8. The system of claim 7, wherein the controller includes one or more motion sensing devices.

9. The system of claim 1, further comprising a visual display.

10. The system of claim 1, wherein the platform is concave.

11. A platform comprising:
    at least one harness support assembly engaged with the platform and extending upward from the platform;
    a safety harness engaged with the harness support assembly,
    wherein the at least one harness support assembly and the safety harness:
       provide horizontal support to a user on the platform, and
       enable vertical movement and rotational movement to the user on the platform, and
    wherein the platform is constructed of a material with a low coefficient of friction and configured to be used with low friction footwear.

12. The platform of claim 11, wherein the at least one harness support assembly and the safety harness provide vertical support to the user on the platform.

13. The platform of claim 11, wherein the low friction footwear includes one or more attached motion sensing devices.

14. The platform of claim 11, further comprising one or more motion sensing devices.

15. The platform of claim 14, wherein the one or more motion sensing devices are inertial sensors.

16. The platform of claim 14, wherein the one or more motion sensing devices are optical sensors.

17. The platform of claim 11, further comprising a controller.

18. The platform of claim 17, wherein the controller includes one or more motion sensing devices.

19. The platform of claim 11, further comprising a visual display.

20. The platform of claim 11, wherein the platform is concave.

* * * * *